United States Patent
Mohan

(10) Patent No.: US 9,245,243 B2
(45) Date of Patent: Jan. 26, 2016

(54) CONCEPT-BASED ANALYSIS OF STRUCTURED AND UNSTRUCTURED DATA USING CONCEPT INHERITANCE

(75) Inventor: Rengaswamy Mohan, Jacksonville, FL (US)

(73) Assignee: uReveal, Inc., Jacksonville, FL (US)

( * ) Notice: Subject to any disclaimer, the term of this patent is extended or adjusted under 35 U.S.C. 154(b) by 128 days.

(21) Appl. No.: 12/423,024

(22) Filed: Apr. 14, 2009

(65) Prior Publication Data

US 2010/0262620 A1 Oct. 14, 2010

(51) Int. Cl.
*G06F 17/30* (2006.01)
*G06Q 10/06* (2012.01)

(52) U.S. Cl.
CPC ..................... *G06Q 10/06* (2013.01)

(58) Field of Classification Search
CPC .......................... G06F 17/30592; G06Q 10/06
USPC ........................................ 707/776, 777, 778
See application file for complete search history.

(56) References Cited

U.S. PATENT DOCUMENTS

| | | | |
|---|---|---|---|
| 4,839,853 A | 6/1989 | Deerwester et al. |
| 5,278,980 A | 1/1994 | Pedersen et al. |
| 5,295,256 A | 3/1994 | Bapat |
| 5,418,951 A | 5/1995 | Damashek |
| 5,488,725 A | 1/1996 | Turtle et al. |
| 5,519,865 A | 5/1996 | Kondo et al. |
| 5,555,408 A | 9/1996 | Fujisawa |
| 5,592,667 A | 1/1997 | Bugajski |
| 5,617,578 A | 4/1997 | Knoll et al. |
| 5,619,709 A | 4/1997 | Caid et al. |
| 5,634,051 A | 5/1997 | Thomson |
| 5,727,950 A | 3/1998 | Cook et al. |
| 5,761,496 A | 6/1998 | Hattori |
| 5,768,578 A | 6/1998 | Kirk et al. |
| 5,794,178 A | 8/1998 | Caid et al. |
| 5,819,260 A | 10/1998 | Lu et al. |
| 5,832,182 A | 11/1998 | Zhang et al. |
| 5,832,470 A | 11/1998 | Morita et al. |
| 5,867,799 A | 2/1999 | Lang et al. |
| 5,884,305 A | 3/1999 | Kleinberg et al. |
| 5,905,498 A | 5/1999 | Diament |
| 5,920,864 A | 7/1999 | Zhao |
| 5,924,090 A | 7/1999 | Krellenstein |

(Continued)

FOREIGN PATENT DOCUMENTS

| | | |
|---|---|---|
| GB | 2399666 A | 9/2004 |
| JP | H07-085041 A | 3/1995 |

(Continued)

OTHER PUBLICATIONS

Jang, Ho Wook and Se Young Park, "Keyfact Concept for an Information Retrieval System," Proceedings of Natural Language Processing Pacific Rim Symposium, pp. 510-513, Dec. 4-7, 1995.

(Continued)

*Primary Examiner* — Huawen Peng
(74) *Attorney, Agent, or Firm* — Cooley LLP

(57) ABSTRACT

In one embodiment, a method comprises defining a set of concepts based on a first set of structured and unstructured data objects, defining a business rule based on the set of concepts, applying the business rule to a second set of structured and unstructured data objects to make a determination associated with that set, and outputting to a display information associated with the determination.

18 Claims, 13 Drawing Sheets

(56) References Cited

U.S. PATENT DOCUMENTS

| | | |
|---|---|---|
| 5,926,811 A | 7/1999 | Miller et al. |
| 5,933,822 A | 8/1999 | Braden-Harder et al. |
| 5,953,726 A | 9/1999 | Carter et al. |
| 5,963,940 A | 10/1999 | Liddy et al. |
| 5,983,214 A | 11/1999 | Lang et al. |
| 5,987,446 A | 11/1999 | Corey et al. |
| 5,987,447 A | 11/1999 | Chang et al. |
| 6,006,221 A | 12/1999 | Liddy et al. |
| 6,026,388 A | 2/2000 | Liddy et al. |
| 6,028,605 A | 2/2000 | Conrad et al. |
| 6,029,161 A | 2/2000 | Lang et al. |
| 6,038,561 A | 3/2000 | Snyder et al. |
| 6,055,526 A | 4/2000 | Ambroziak |
| 6,078,924 A | 6/2000 | Ainsbury et al. |
| 6,101,491 A | 8/2000 | Woods |
| 6,101,492 A | 8/2000 | Jacquemin et al. |
| 6,101,515 A | 8/2000 | Wical et al. |
| 6,122,628 A | 9/2000 | Castelli et al. |
| 6,182,063 B1 | 1/2001 | Woods |
| 6,189,002 B1 | 2/2001 | Roitblat |
| 6,195,657 B1 | 2/2001 | Rucker et al. |
| 6,199,034 B1 | 3/2001 | Wical |
| 6,199,067 B1 | 3/2001 | Geller |
| 6,233,575 B1 | 5/2001 | Agrawal et al. |
| 6,236,987 B1 | 5/2001 | Horowitz et al. |
| 6,256,633 B1 | 7/2001 | Dharap |
| 6,263,335 B1 | 7/2001 | Paik et al. |
| 6,289,382 B1 | 9/2001 | Bowman-Amuah |
| 6,300,957 B1 | 10/2001 | Rao et al. |
| 6,308,175 B1 | 10/2001 | Lang et al. |
| 6,314,420 B1 | 11/2001 | Lang et al. |
| 6,327,593 B1 | 12/2001 | Gioffon |
| 6,330,563 B1 | 12/2001 | Heckerman |
| 6,366,908 B1 | 4/2002 | Chong et al. |
| 6,377,259 B1 | 4/2002 | Tenev et al. |
| 6,385,600 B1 | 5/2002 | McGuinness et al. |
| 6,385,602 B1 | 5/2002 | Tso et al. |
| 6,411,924 B1 | 6/2002 | de Hita et al. |
| 6,424,973 B1 | 7/2002 | Baclawski |
| 6,442,545 B1 | 8/2002 | Feldman et al. |
| 6,453,312 B1 | 9/2002 | Goiffon et al. |
| 6,453,339 B1 | 9/2002 | Schultz et al. |
| 6,477,524 B1 | 11/2002 | Taskiran et al. |
| 6,492,989 B1 | 12/2002 | Wilkinson |
| 6,496,818 B1 | 12/2002 | Ponte |
| 6,502,045 B1 | 12/2002 | Biagiotti |
| 6,510,406 B1 | 1/2003 | Marchisio |
| 6,513,036 B2 | 1/2003 | Fruensgaard et al. |
| 6,523,028 B1 | 2/2003 | DiDomizio et al. |
| 6,532,469 B1 | 3/2003 | Feldman et al. |
| 6,539,376 B1 | 3/2003 | Sundaresan et al. |
| 6,564,210 B1 | 5/2003 | Korda et al. |
| 6,567,797 B1 | 5/2003 | Schuetze et al. |
| 6,567,804 B1 | 5/2003 | Ramasamy et al. |
| 6,581,068 B1 | 6/2003 | Bensoussan et al. |
| 6,606,659 B1 | 8/2003 | Hegli et al. |
| 6,611,825 B1 | 8/2003 | Billheimer et al. |
| 6,615,199 B1 | 9/2003 | Bowman-Amuah |
| 6,615,253 B1 | 9/2003 | Bowman-Amuah |
| 6,628,312 B1 | 9/2003 | Rao et al. |
| 6,629,095 B1 | 9/2003 | Wagstaff et al. |
| 6,629,097 B1 | 9/2003 | Keith |
| 6,633,868 B1 | 10/2003 | Min et al. |
| 6,636,242 B2 | 10/2003 | Bowman-Amuah |
| 6,636,848 B1 | 10/2003 | Aridor et al. |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,643,661 B2 | 11/2003 | Polizzi et al. |
| 6,651,058 B1 | 11/2003 | Sundaresan et al. |
| 6,654,761 B2 | 11/2003 | Tenev et al. |
| 6,665,662 B1 | 12/2003 | Kirkwood et al. |
| 6,675,159 B1 | 1/2004 | Lin et al. |
| 6,678,700 B1 | 1/2004 | Moore et al. |
| 6,684,207 B1 | 1/2004 | Greenfield et al. |
| 6,701,305 B1 | 3/2004 | Holt et al. |
| 6,711,585 B1 | 3/2004 | Copperman et al. |
| 6,715,145 B1 | 3/2004 | Bowman-Amuah |
| 6,728,707 B1 | 4/2004 | Wakefield et al. |
| 6,732,097 B1 | 5/2004 | Wakefield et al. |
| 6,732,098 B1 | 5/2004 | Wakefield et al. |
| 6,738,765 B1 | 5/2004 | Wakefield et al. |
| 6,741,988 B1 | 5/2004 | Wakefield et al. |
| 6,742,015 B1 | 5/2004 | Bowman-Amuah |
| 6,766,316 B2 | 7/2004 | Caudill et al. |
| 6,778,979 B2 | 8/2004 | Grefenstette et al. |
| 6,842,906 B1 | 1/2005 | Bowman-Amuah |
| 6,862,713 B1 | 3/2005 | Kraft et al. |
| 6,892,189 B2 | 5/2005 | Quass et al. |
| 6,895,406 B2 | 5/2005 | Fables et al. |
| 6,901,555 B2 | 5/2005 | Hida et al. |
| 6,928,398 B1 | 8/2005 | Fang et al. |
| 6,941,321 B2 | 9/2005 | Schuetze et al. |
| 6,944,626 B2 | 9/2005 | Cameron et al. |
| 6,961,731 B2 | 11/2005 | Holbrook |
| 6,970,860 B1 | 11/2005 | Liu et al. |
| 6,970,881 B1 | 11/2005 | Mohan et al. |
| 6,976,017 B1 | 12/2005 | Getchius |
| 7,007,034 B1 | 2/2006 | Hartman et al. |
| 7,010,752 B2 | 3/2006 | Ly |
| 7,019,744 B2 | 3/2006 | Anderson |
| 7,023,453 B2 | 4/2006 | Wilkinson et al. |
| 7,194,460 B2 | 3/2007 | Komamura |
| 7,194,483 B1 | 3/2007 | Mohan et al. |
| 7,277,879 B2 | 10/2007 | Varadarajan |
| 7,349,895 B2 | 3/2008 | Liu et al. |
| 7,505,989 B2 * | 3/2009 | Gardner et al. .......... 1/1 |
| 7,536,413 B1 | 5/2009 | Mohan et al. |
| 7,627,588 B1 | 12/2009 | Mohan et al. |
| 7,650,405 B2 | 1/2010 | Hood et al. |
| 7,676,485 B2 | 3/2010 | Elfayoumy |
| 7,788,251 B2 | 8/2010 | Carlson |
| 7,831,559 B1 | 11/2010 | Mohan et al. |
| 7,890,514 B1 * | 2/2011 | Mohan et al. .......... 707/748 |
| 2001/0011266 A1 | 8/2001 | Baba |
| 2002/0007373 A1 | 1/2002 | Blair et al. |
| 2002/0016800 A1 | 2/2002 | Spivak et al. |
| 2002/0069203 A1 | 6/2002 | Dar et al. |
| 2002/0091696 A1 | 7/2002 | Craft et al. |
| 2002/0107844 A1 | 8/2002 | Cha et al. |
| 2002/0120609 A1 | 8/2002 | Lang et al. |
| 2002/0129015 A1 | 9/2002 | Caudill et al. |
| 2003/0014403 A1 | 1/2003 | Chandrasekar et al. |
| 2003/0018659 A1 | 1/2003 | Fuks et al. |
| 2003/0041056 A1 | 2/2003 | Bossemeyer, Jr. et al. |
| 2003/0069882 A1 | 4/2003 | Nieswand et al. |
| 2003/0074177 A1 | 4/2003 | Bowen |
| 2003/0149586 A1 | 8/2003 | Chen et al. |
| 2003/0163454 A1 | 8/2003 | Jacobsen et al. |
| 2003/0187632 A1 | 10/2003 | Menich |
| 2004/0002959 A1 | 1/2004 | Alpert et al. |
| 2004/0019588 A1 | 1/2004 | Doganata et al. |
| 2004/0049478 A1 | 3/2004 | Jasper et al. |
| 2004/0083206 A1 | 4/2004 | Wu et al. |
| 2004/0167870 A1 | 8/2004 | Wakefield et al. |
| 2004/0167883 A1 | 8/2004 | Wakefield et al. |
| 2004/0167884 A1 | 8/2004 | Wakefield et al. |
| 2004/0167885 A1 | 8/2004 | Wakefield et al. |
| 2004/0167886 A1 | 8/2004 | Wakefield et al. |
| 2004/0167887 A1 | 8/2004 | Wakefield et al. |
| 2004/0167907 A1 | 8/2004 | Wakefield et al. |
| 2004/0167908 A1 | 8/2004 | Wakefield et al. |
| 2004/0167909 A1 | 8/2004 | Wakefield et al. |
| 2004/0167910 A1 | 8/2004 | Wakefield et al. |
| 2004/0167911 A1 | 8/2004 | Wakefield et al. |
| 2004/0199498 A1 | 10/2004 | Kapur et al. |
| 2004/0215634 A1 | 10/2004 | Wakefield et al. |
| 2004/0254916 A1 | 12/2004 | Dettinger et al. |
| 2005/0021290 A1 | 1/2005 | Velipasaoglu |
| 2005/0021357 A1 | 1/2005 | Schuetze et al. |
| 2005/0021512 A1 | 1/2005 | Koenig |
| 2005/0060340 A1 | 3/2005 | Sommerfield |
| 2005/0065967 A1 | 3/2005 | Schuetze et al. |
| 2005/0091197 A1 | 4/2005 | Dettinger |

(56) References Cited

U.S. PATENT DOCUMENTS

| | | | |
|---|---|---|---|
| 2005/0091198 A1 | 4/2005 | Dettinger | |
| 2005/0108256 A1 | 5/2005 | Wakefield et al. | |
| 2005/0149496 A1 | 7/2005 | Mukherjee et al. | |
| 2005/0154692 A1 | 7/2005 | Jacobsen et al. | |
| 2005/0154711 A1 | 7/2005 | McConnell | |
| 2005/0160080 A1 | 7/2005 | Dawson | |
| 2005/0160082 A1 | 7/2005 | Dawson | |
| 2005/0160107 A1 | 7/2005 | Liang | |
| 2005/0166152 A1 | 7/2005 | Hida et al. | |
| 2005/0192824 A1 | 9/2005 | Schuetze et al. | |
| 2005/0192926 A1 | 9/2005 | Liu et al. | |
| 2005/0193055 A1 | 9/2005 | Angel et al. | |
| 2005/0234879 A1 | 10/2005 | Zeng et al. | |
| 2005/0246320 A1 | 11/2005 | Benysh et al. | |
| 2005/0278323 A1 | 12/2005 | Horvitz et al. | |
| 2006/0015486 A1 | 1/2006 | Nomiyama et al. | |
| 2006/0047649 A1 | 3/2006 | Liang | |
| 2006/0074836 A1* | 4/2006 | Gardner et al. | 706/60 |
| 2006/0100854 A1 | 5/2006 | Ance et al. | |
| 2006/0106793 A1 | 5/2006 | Liang | |
| 2006/0161423 A1 | 7/2006 | Scott et al. | |
| 2007/0033221 A1 | 2/2007 | Copperman et al. | |
| 2007/0073680 A1 | 3/2007 | Kawamura et al. | |
| 2007/0113292 A1* | 5/2007 | Kao et al. | 726/27 |
| 2007/0192272 A1 | 8/2007 | Elfayoumy | |
| 2007/0282809 A1 | 12/2007 | Hoeber et al. | |
| 2008/0065603 A1 | 3/2008 | Carlson | |
| 2008/0288431 A1 | 11/2008 | Colson et al. | |
| 2009/0254379 A1* | 10/2009 | Adams et al. | 705/4 |

FOREIGN PATENT DOCUMENTS

| | | |
|---|---|---|
| JP | 2002149675 A | 5/2002 |
| WO | WO 99/18825 | 9/1999 |
| WO | WO 00/063841 | 10/2000 |
| WO | WO 01/22280 A2 | 3/2001 |
| WO | WO 02/39254 A1 | 5/2002 |
| WO | WO 03/040892 A2 | 5/2003 |
| WO | WO 2004/053645 A2 | 6/2004 |
| WO | WO 2005/069881 A2 | 8/2005 |
| WO | WO 2007/047252 | 4/2007 |

OTHER PUBLICATIONS

Jun, M.S. & Park, S.Y. "Keyfact-Based Information Retrieval System", International Symposium on Digital Library, pp. 521-524 (1997).
U.S. Appl. No. 10/684,434, filed Oct. 15, 2003, Motoyama et al.
U.S. Appl. No. 10/695,426, filed Oct. 3, 2003, Final Office Action dated Nov. 9, 2009.
U.S. Appl. No. 11/275,046, filed Dec. 5, 2005, Office Action dated Oct. 13, 2009.
U.S. Appl. No. 11/275,048, filed Dec. 5, 2005, Office Action dated Jun. 11, 2009.
U.S. Appl. No. 11/275,048, filed Dec. 5, 2005, final Office Action dated Jan. 7, 2010.
Notice of Allowance, U.S. Appl. No. 10/677,492, filed Oct. 3, 2003, Notice of Allowance dated Jul. 10, 2009.
Notice of Allowance, U.S. Appl. No. 11/275,050, filed Dec. 5, 2005, Notice of Allowance dated Dec. 2, 2008—Patented—U.S. Pat. No. 7,536,413, issued May 19, 2009.
Notice of Allowance, U.S. Appl. No. 11/656,017, filed Jan. 22, 2007, Notice of Allowance dated Oct. 5, 2009.
Chinese Office Action, CN 200680045412.0 issued Feb. 5, 2010.
Notice of Allowance, U.S. Appl. No. 11/548,456, filed Oct. 11, 2006, Notice of Allowance dated Apr. 1, 2010.
Notice of Allowance, U.S. Appl. No. 11/275,048, filed Dec. 5, 2008, Notice of Allowance dated Apr. 27, 2010.
International Search Report and Written Opinion, PCT/US10/30801, filed Apr. 13, 2010, ISR/WO dated Jun. 10, 2010.
Ankerst, et al., "DataJewel: Tightly Integrating Visualization with Temporal Data Mining" ICDM Workshop on Visual Data Mining, Melbourne, FL, Nov. 19-23, 2003.
Arents, H.C. et al., "Concept-Based Retrieval of Hypermedia Information: From Term Indexing to Semantic Hyperindexing," Information Processing & Management vol. 29, No. 3, pp. 373-386, May-Jun. 1993.
Belew, Richard, "A connectionist approach to conceptual Information Retrieval," ICAIL, May 27-29, 1987.
Bhatia et al., Conceptual Clustering in Information Retrieval, Systems, Man, and Cybernetics, Part B, IEEE Transactions, v. 28, issue 3, pp. 427-436, Jun. 1998.
Boeing Frontiers, "Text mining for golden results," p. 50, Jul. 2005.
Botev et al. "Context-sensitive keyword search and ranking for XML" Eighth International Workshop on the Web and Databases, Jun. 16-17, 2005, 6 pages.
Crouch, C. et al., Experiments in automatic statistical thesaurus construction, Proceedings of the Fifteenth Annual International ACM SIGIR Conference on Research and development in Information Retrieval, pp. 77-88, Jun. 21-24, 1992.
Deerwester et al., "Indexing by latent semantic analysis," Journal of the Society for Information Science, vol. 41, No. 6, 391-407, Sep. 1990.
Dumais et al., "Inductive Learning Algorithms and Representations for Text Categorization", Proceedings of the seventh international conference on information and knowledge management, pp. 148-155, ACM Press, 1998.
Dumais et al "optimizing search by showing results in context" SIGHCHL'01 Mar. 31-Apr. 5, 2001.
Fagan, J., "Automatic phrase indexing for document retrieval," Proceedings of the Tenth Annual International aCM SIGIR Conference on Research and Development in Information Retrieval, pp. 91-101, Jun. 3-5, 1987.
Feldman, "Tutorial 4, Mining Unstructured Data", KDD Tutorial Notes, pp. 182-236, 1999.
Finkelstein et al., "Placing search in context: The concept revisited," Tenth International Conference on World Wide Web, pp. 406-414, May 1-5, 2001.
Giger, H.P., Concept Based Retrieval in Classical IR Systems, Proceedings of the Eleventh Annual International SCM SIGIR Conference on Research and Development in Information Retrieval, pp. 275-289, May 1998.
Haveliwala, Topic-sensitive pagerank: A context-sensitive ranking algorithm for web search, Eleventh International Conference on world Wide Web, May 7-11, 2002, IEEE, Jul. 15, 2002, 22 pages.
Jain et al., Data Clustering: A Review, ACM Computing Surveys, vol. 31, No. 3, Sep. 1999, pp. 264-323.
Kolda et al., A Semidiscrete Matrix Decomposition for Latent Semantic Indexing in Information Retrieval, ACM Transactions on Information Systems (TOIS), vol. 16, Issue 4, pp. 322-346, Oct. 1998.
Kritzestein, B., "Starlight: Knowledge Management on a Whole New Plane," Chemical and Biological Defense Infor analysis center Newsletter, vol. 5, No. 4, pp. 10-12, Fall 2004.
Lawrence, S., "Context in Web search," Data Engineering, IEEE Computer Society, vol. 23, No. 3, pp. 25-32, Sep. 2000.
Leake et al., "Exploiting rich context: An incremental approach to context-based web search," Proceedings of Fifth International and Interdisciplinary Conference on Modeling and Using Context, Paris, France, vol. 3554, pp. 254-267, Jul. 5-8, 2005.
Leake et al., "Towards context-based search engine selection," Sixth International Conference on Intelligent User Interfaces, Santa Fe, New Mexico, pp. 109-112, Jan. 14-17, 2001.
Nigam et al., "Learning to classify Text From Labeled and Unlabeled Documents", Proceedings of AAAI-98, 15th Conference of the American Association for artificial Intelligence, Jul. 1998, pp. 792-799.
Salton, G. et al., "A Vector Space Model for Automatic Indexing," Communications of the ACM, vol. 18, No. 11, pp. 613-620, Nov. 1975.
Singh et al., Generating association Rules From Semi-Structured Documents Using an Extended Concept Hierarchy, Proceedings of the sixth international conference on information and knowledge Management, pp. 193-200, Nov. 10-14, 1997.
Yang, "an Evaluation of Statistical approaches to Text Categorization", Information Retrieval, vol. 1, issue 1-2, pp. 69-90, 1999.

(56) References Cited

OTHER PUBLICATIONS

Codd, E.F. et al., "Providing OLAP to User-Analysts: An IT Mandate," Hyperion Solutions Corporation, CA, 1993 pp. 1-20.
Grotevant, S.M. and Foth D. "The Power of Multidimensional Analysis (OLAP) in Higher Education Enterprise Reporting Strategies," presented at CUMREC 1999, printed Feb. 27, 2006 from http://www.educause.edu/ir/library/html/cmr9917/cmr9917.html, 8 pages.
U.S. Appl. No. 10/677,492, filed Oct. 3, 2003; Mohan et al.
U.S. Appl. No. 10/695,426, filed Oct. 29, 2003; Mohan.
U.S. Appl. No. 11/275,046, filed Dec. 5, 2005; Mohan et al.
U.S. Appl. No. 11/275,048, filed Dec. 5, 2005; Mohan et al.
Office Action; U.S. Appl. No. 10/087,053, filed Mar. 1, 2002, Office Action dated Aug. 20, 2004—Patented U.S. Pat. No. 6,970,881, issued Nov. 29, 2005.
Office Action; U.S. Appl. No. 10/393,677, filed Mar. 19, 2003, Office Action dated Dec. 7, 2005—Patented U.S. Pat. No. 7,194,483, issued Mar. 20, 2007.
Office Action; U.S. Appl. No. 10/677,492, filed Oct. 3, 2003, Office Action dated May 2, 2006.
Office Action; U.S. Appl. No. 10/677,492, filed Oct. 3, 2003, Office Action dated Feb. 27, 2007.
Office Action; U.S. Appl. No. 10/677,492, filed Oct. 3, 2003, Office Action dated Aug. 27, 2007.
Office Action; U.S. Appl. No. 10/677,492, filed Oct. 3, 2003, Office Action dated Apr. 21, 2008.
Office Action; U.S. Appl. No. 10/677,492, filed Oct. 3, 2003, Office Action dated Dec. 23, 2008.
Office Action; U.S. Appl. No. 10/695,426, filed Oct. 3, 2003, Office Action dated Aug. 23, 2007.
Office Action; U.S. Appl. No. 10/695,426, filed Oct. 3, 2003, Office Action dated Jun. 17, 2008.
Office Action; U.S. Appl. No. 10/695,426, filed Oct. 3, 2003, Office Action dated Mar. 5, 2009.
Office Action; U.S. Appl. No. 11/275,046, filed Dec. 5, 2005, Office Action dated Oct. 31, 2007.
Office Action; U.S. Appl. No. 11/275,046, filed Dec. 5, 2005, Office Action dated Jul. 25, 2008.
Office Action; U.S. Appl. No. 11/275,046, filed Dec. 5, 2005, Office Action dated Mar. 18, 2009.
Office Action; U.S. Appl. No. 11/275,048, filed Dec. 5, 2005, Office Action dated Dec. 11, 2007.
Office Action; U.S. Appl. No. 11/275,048, filed Dec. 5, 2005, Office Action dated Aug. 29, 2008.
Office Action; U.S. Appl. No. 11/275,048, filed Dec. 5, 2005, Office Action dated Jun. 11, 2009.
Office Action; U.S. Appl. No. 11/275,050, filed Dec. 5, 2005, Office Action dated Nov. 14, 2007—Patented—U.S. Pat. No. 7,536,413, issued May 19, 2009.
Office Action; U.S. Application No. 11/275,050, filed Dec. 5, 2005, Office Action dated Jul. 29, 2008—Patented—U.S. Pat. No. 7,536,413, issued May 19, 2009.
Office Action; U.S. Appl. No. 11/548,456, filed Oct. 11, 2006, Office Action dated Aug. 20, 2008.
Office Action; U.S. Appl. No. 11/548,456, filed Oct. 11, 2006, Office Action dated Apr. 14, 2009.
Office Action; U.S. Appl. No. 11/656,017, filed Jan. 22, 2007, Office Action dated Jan. 26, 2009.
International Search Report for International Application No. PCT/US06/39511, mailed Apr. 25, 2007, 3 pages.
European Search Report issued in EP Application No. 06816600.8, Jun. 15, 2009, 6 pgs.
Notice of Allowance, U.S. Appl. No. 10/087,053, filed Mar. 1, 2002, Notice of Allowance dated Mar. 28, 2005.
Notice of Allowance, U.S. Appl. No. 10/393,677, filed Mar. 19, 2003, Notice of Allowance dated Dec. 29, 2006.
Notice of Allowance, U.S. Appl. No. 10/393,677, filed Mar. 19, 2003, Corrected Notice of Allowance dated Jul. 13, 2006.
Fishwick et al., Ontologies for modeling and simulation: issues and approaches, IEEE, vol. 1, Dec. 5-8, 2004, 6 pages.
Cross, Fuzzy semantic distance measures between ontological concepts, IEEE, vol. 2, Jun. 27-30, 2004, pp. 635-640.
U.S. Appl. No. 10/695,426, filed Oct. 29, 2003, Office Action dated Mar. 5, 2009.
U.S. Appl. No. 10/695,426, filed Oct. 29, 2003, Office Action dated May 24, 2010.
U.S. Appl. No. 10/695,426, filed Oct. 29, 2003, Office Action dated Nov. 1, 2010.
U.S. Appl. No. 10/695,426, filed Oct. 29, 2003, Office Action dated May 13, 2011.
U.S. Appl. No. 11/275,046, filed Dec. 5, 2005, Office Action dated Apr. 23, 2010.
U.S. Appl. No. 11/548,456, filed Oct. 11, 2006, Office Action dated Oct. 13, 2009.
U.S. Appl. No. 11/656,017, filed Jan. 22, 2007, Office Action dated Jul. 8, 2009.
Australian Application No. 2006304061 Examination Report issued Dec. 13, 2010.
Yihua Shi, "Semantic Searching for WEB Shops," Technical Report of The Institute of Electronics, Information and Communication Engineers, Japan, The Institute of Electronics, Information and Communication Engineers, Oct. 2, 2003, vol. 103, No. 358, pp. 13-18.
Chinese Office Action for Application No. 200680045412.0 issued Jul. 8, 2010.
European Examination Report for Application No. 06816600.8, dated Nov. 15, 2011.
Japanese Office Action for Application No. 2008-535618, mailed Jan. 19, 2012.
Office Action dated Nov. 22, 2011 mailed in U.S. Appl. No. 10/695,426.
International Search Report and Written Opinion for International Application No. PCT/US12/20478, mailed May 3, 2012.
Office Action for Japanese Patent Application No. 2014-265104 mailed Oct. 1, 2015.

\* cited by examiner

1010 — Potentially_Fraudulent_Claim = (LimitedCarDamage OR 3rdPartyWrite-off OR 3rdPartyStolenCarNoRegistration OR ClaimantFalseInformation OR SuspiciousClaimHandler OR 3rdPartyEagerSettle OR Claimant3rdPartyDisagree OR IndividualWatchList)

=

1020 — Potentially_Fraudulent_Claim = (("limited" OR "minim~" OR "little" OR "slight~" OR "minor") w/3 "damage~") OR (3rdPartyVIN_Writeoff = True) OR ((3rdPartyVIN_Stolen = True) AND (3rdParty_NoRegistration = True)) OR ("claimant~" w/10 ("false~" OR "lie~" OR "mistruth~" OR "misrepresent~")) OR ("claim handler~" w/ 5 ("suspicious" OR "suspect~" OR "untrustworthy")) OR (("third party" OR "other insurance") w/10 ("eager~" OR "read~" OR "interest~") w/ 3 ("settle~")) OR ("claimant~" w/10 ("third part~" OR "other insur~") w/5 ("disagree~" OR "differ~")) OR ((claimant_watch_list = True) OR (3rd_party_watch_ilst = True))

CONCEPT-BASED ANALYSIS OF STRUCTURED AND UNSTRUCTURED DATA USING CONCEPT INHERITANCE

BACKGROUND

Embodiments described herein relate generally to information analysis, and more particularly to methods and apparatus for concept-based analysis of structured and unstructured data.

Organizations often utilize sophisticated computer systems and databases to inform and automate portions of the decision-making process. Many such systems organize relevant data into a structured format (such as a relational database), making it accessible by a broad array of query, analysis, and reporting applications. Some of these systems programmatically calculate business decisions and make assessments based on available data and program logic. However, often much of the information relevant to these calculations is stored in a variety of unstructured formats—such as handwritten notes, word processor documents, e-mails, saved web pages, printed forms, photographic prints, and the like.

Because typical systems are incapable of organizing and searching the content of such documents, their decision outputs are generally based on only the subset of pertinent information that exists in structured form—rendering these outputs incomplete and at times inaccurate. Those systems that do incorporate unstructured data into their decision-making algorithms often convert text information into a coded form that can be stored in a structured format (such as a relational database field). This approach is undesirable, however, because much context and meaning can be lost when a complex idea conveyed in language is shoe-horned into a simple, coded form.

Further, traditional techniques for logically combining such coded data are susceptible to producing false positives, as correlations between factors that contribute to a given decision output are not accounted for in such models. More specifically, in a given scenario in which multiple factors contribute to a particular outcome or determination, many systems generate a determination based on the number of those factors present in a given data set—defining rules that assume an increased likelihood of a given output for each additional factor present in the data set. This approach is flawed, however, because two or more of these factors may not occur independently in the data. For example, two or more such factors could be positively correlated, such that the presence of a first factor always implies the presence of the second. In such a scenario, if the first factor is present, the presence of the second factor does not increase the likelihood of the particular output under consideration. This flaw can result in the generation of a false positive, as the system inappropriately includes the presence of the second factor as an additional weight in its decision calculus.

Additionally, the inability of a system to properly incorporate unstructured data into its calculations forces individuals to consider the relevant unstructured documents separately—without the significant aid of computer processing power. This laborious task not only greatly increases the time and cost of the decision-making process, but also introduces additional imprecision, as individuals are unlikely to analyze data with the consistency and speed of a computerized solution. Finally, individuals are unlikely to optimally combine their own intuitions regarding a set of unstructured data with computer-generated analysis of structured data to reach an accurate final conclusion.

Thus, a need exists for methods and apparatus that programmatically organize and analyze structured and unstructured data together, and apply business logic to make accurate determinations based on that data. A need further exists for methods and apparatus that analyze and make a determination about a set of data, using techniques that avoid the false positives that often result when contributing factors and concepts are positively-correlated within the data.

SUMMARY

In one embodiment, a method comprises defining a set of concepts based on a first set of structured and unstructured data objects, defining a business rule based on the set of concepts, applying the business rule to a second set of structured and unstructured data objects to make a determination associated with that set, and outputting to a display information associated with the determination.

BRIEF DESCRIPTION OF THE DRAWINGS

FIG. 10 is a word diagram that illustrates an exemplary business rule generated by the exemplary computerized decision system discussed in connection with FIG. 8.

FIG. 13 illustrates a business rule designed, when applied to a set of data, to produce a determination as to whether an automobile claim included in the data is suspicious.

DETAILED DESCRIPTION

Figure 1:
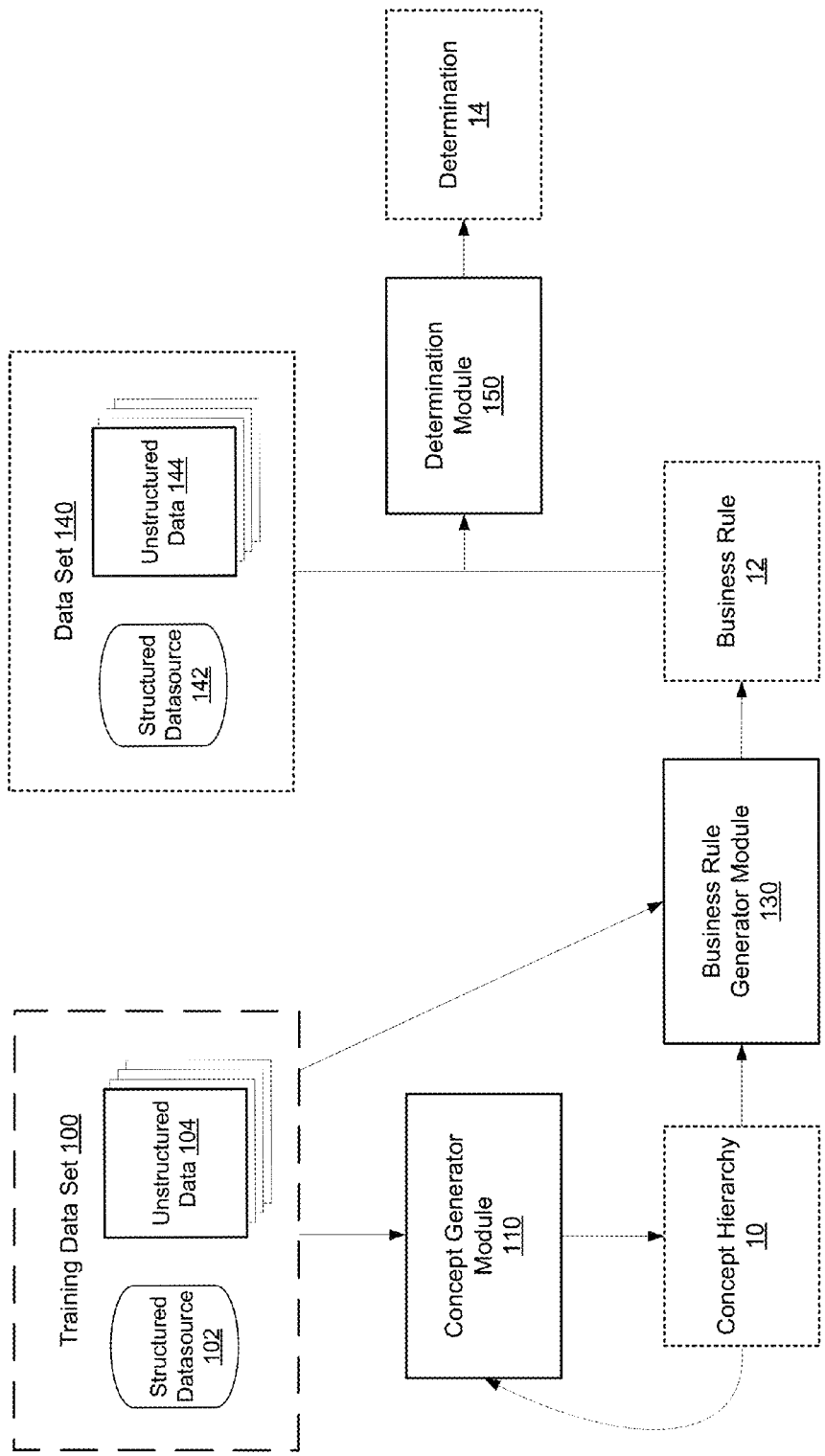
FIG. 1 is a schematic diagram that illustrates a computerized decision system that utilizes both structured and unstructured data, according to an embodiment.

A computerized decision system can be configured to organize the content of a first set of structured and unstructured data into a concept hierarchy. In some embodiments the decision system can generate a business rule based on the concept hierarchy, and execute the business rule on the first set of structured and unstructured data to calculate a determination based on the data. In some embodiments, the decision system can execute the business rule on a second set of structured and unstructured data, different from the first, to calculate a determination based on the second set of data. In some embodiments, the decision system can output information associated with the determination to a display.

The concept hierarchy can be based on, for example, any combination of any number of: a concept present in the content of one or more unstructured data objects, a coded data value in a particular range, or one or more other concepts. A concept can be, for example, one or more words or phrases that convey an idea. In some embodiments, the concept hierarchy can include a concept based at least in part on a regular expression that evaluates the presence or absence of a particular subconcept in the content of an unstructured data object.

In some embodiments, the computerized decision system can be configured to provide functionality that assists a user in defining a business rule based on the first set of structured and unstructured data. The business rule can, for example, include one or more logical relationships between one or more concepts that when evaluated produce a determination based on a set of structured and unstructured data. In some embodiments, the decision system can present a user with reports about the first set of structured and unstructured data to assist the user in defining the business rule. In some embodiments, the decision system can include functionality that allows a user to test the defined business rule for accuracy and subsequently edit the business rule to increase precision.

The computerized decision system can additionally be configured to execute the business rule on the first set of structured and unstructured data. In some embodiments, the decision system can include a determination module that parses the business rule and searches within the first set of structured and unstructured data for each concept included in the business rule. The determination module can also include, for example, functionality to evaluate the business rule based on the presence or absence of each concept within the data set and the logical relationships between the concepts defined by the business rule, thereby producing a determination about the data set. In some embodiments, the determination module can be configured to output text or information associated with the determination to a display device for viewing by a user. In some embodiments, the determination module can be configured to store the determination to a memory or transfer information associated with the determination to another software-based module or hardware device for further analysis, storage, or display.

FIG. 1 is a schematic diagram that illustrates a computerized decision system that utilizes both structured and unstructured data, according to an embodiment. Specifically, FIG. 1 illustrates an optional training data set 100, which serves as an input to a concept generator module 110 and business rule generator module 130. The training data set 100 includes a structured data source 102 and one or more unstructured data objects 104. The concept generator module 110 generates a concept hierarchy 10, which in turn serves as an input to a business rule generator module 130. The business rule generator module 130 outputs a business rule 12, which, along with a data set 140, are used by a determination module 150 to generate a determination 14 based on the data set 140. The data set 140 includes a structured data source 142 and one or more unstructured data objects 144.

Any or all of the several modules in the illustrated computerized decision system can be implemented, for example, in hardware (e.g., a processor, an application-specific integrated circuit (ASIC), or a field programmable gate array (FPGA)), and/or in software that resides on a hardware device (e.g., a processor) or in a memory (e.g., a RAM, a ROM, a hard disk drive, an optical drive, or other removable media) coupled to a processor. The several modules can be implemented and/or resident on devices connected over, for example, a communications network such as any combination of a local area network (LAN), a wide area network (WAN), the Internet, and/or a wireless data connection, such as a Bluetooth or infrared connection.

The optional training data set 100 can reside, for example, in a computerized memory such as a RAM, a ROM, a hard disk drive, an optical drive, or other removable media. The structured data source 102 can be organized into, for example, a relational database such as a Structured Query Language (SQL) database, one or more comma-separated values (CSV) files, one or more other pattern-delimited files, or other structured data format hierarchy. The unstructured data objects 104 can be, for example, one or more of: a handwritten document, a typed document, an electronic word-processor document, a printed or electronic spreadsheet document, a printed form or chart, or other electronic document that contains text such as an e-mail, Adobe PDF document, Microsoft Office document, and the like. In some embodiments, the structured data source 102 can include, for example, one or more unstructured data elements, such as a string of text stored in as a relational database column of type string or varchar.

In some embodiments, the optional training data set 100 can be omitted. In such embodiments, data set 140 can be connected to concept generator module 110 and to business rule generator module 130. In such embodiments, data set 140 can perform the functions of optional training data set 100 described herein.

In some embodiments, the concept generator module 110 can receive data that includes a set of structured and/or unstructured data, such as the optional training data set 100. Upon receipt of the set of structured and unstructured data, the concept generator module 110 can be configured to generate a concept hierarchy 10, by, for example executing a concept extraction technique such as that detailed in U.S. Pat. No. 7,194,483 to Mohan et al., the disclosure of which is incorporated herein by reference in its entirety.

In some embodiments, the concept generator module 110 can be configured to provide functionality that allows a user to add a concept to or delete a concept from the concept hierarchy 10. Additionally, the concept generator module 110 can provide functionality that allows a user to edit an existing concept or relationship between one or more concepts. More specifically, the concept generator module 110 can be configured to display a visual representation of the resulting concept hierarchy 10 and to include functionality that allows a user to send input signals to the concept generator module that indicate a desired change to the concept hierarchy 10. The concept generator module 110 can be configured to receive these signals and accordingly update the concept hierarchy 10 according to the desired changes. In some embodiments, the concept generator module can be configured to receive a file that defines one or more concepts, with the location of the file being specified by a user. The concept generator module can include the one or more concepts as part of the concept hierarchy 10. In some embodiments, the above-described concept hierarchy definition methods can be performed iteratively until the concept generator module 10 receives a signal from a user indicating that the concept hierarchy 10 is acceptable. In some embodiments, the concept generator module 110 can be configured to detect concepts within the optional training data set 100 that are positively-correlated within the data. After this detection process, the concept generator module can recursively combine such concepts into higher-level concepts until all highest-level concepts in the concept hierarchy 10 occur independently of one another in the optional training data set 100.

The business rule generator module 130 can be configured to receive data that includes the concept hierarchy 10. In some embodiments, the business rule generator module 130 can receive the contents of the concept hierarchy 10 by reading the concept hierarchy 10 from a removable storage medium such as an optical disc, an external hard disk drive, or a flash memory module. The business rule generator module 130 can be, for example, a software-based module that resides on a hardware device. Alternatively, in some embodiments, the business rule generator module 130 can be a hardware device.

In some embodiments, the business rule generator module 130 can provide to a user functionality for composing a business rule based on the concept hierarchy 10. The business rule generator module 130 can, for example, provide a graphical user interface that includes a visual representation of the concepts and concept relationships that comprise the concept hierarchy 10. Such an interface can, for example, allow a user to manipulate the visual representation and enter logic to define a business rule 12.

The structured data source 102 can be organized into, for example, a relational database such as a Structured Query Language (SQL) database, one or more comma-separated values (CSV) files, one or more other pattern-delimited files, or other structured data format hierarchy. The unstructured data 142 can include, for example, one or more of: a handwritten document, a typed document, an electronic word-processor document, a printed or electronic spreadsheet document, a printed form or chart, or other electronic document that contains text such as an e-mail, Adobe PDF document, Microsoft Office document, and the like. In some embodiments, the structured data source 102 can include, for example, one or more unstructured data elements, such as a string of text stored in as a relational database column of type string or varchar.

In some embodiments, the determination module 150 can receive the contents of the business rule 12 via a removable storage medium such as an optical disc, an external hard disk drive, or a flash memory module.

The determination module 150 can be configured to execute the business rule 12 using the data set 140 to produce a determination 14. In some embodiments, the determination rule 150 can be configured to output text and/or graphics associated with the determination 14 to a display such as a computer monitor, television, LCD or LED screen, or video projector.

Figure 2:
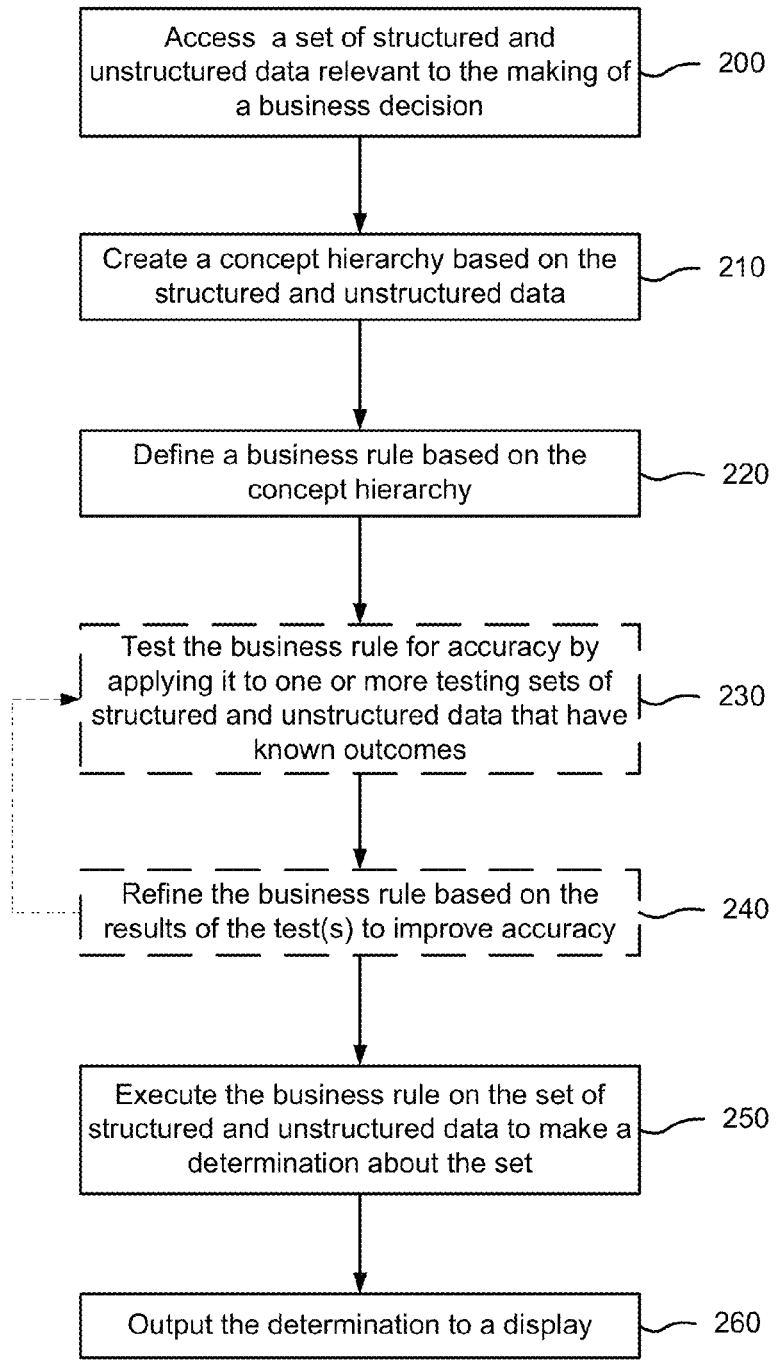
FIG. 2 is a flowchart that illustrates a method for defining and utilizing a business rule to make a determination about a set of structured and unstructured data, according to an embodiment.

FIG. 2 is a flowchart that illustrates a method for defining and utilizing a business rule to make a determination about a set of structured and unstructured data, according to an embodiment. As shown in FIG. 2, a first set of structured and unstructured data relevant to the making of a business decision can be accessed, at 200. The set of structured and unstructured data can be stored, for example, on a computer system such as a personal computer or network server. In some embodiments, the structured and unstructured data can be stored in a relational database and accessed by a software- or hardware-based module, similar to the concept generator module described in connection with FIG. 1 The stored structured and unstructured data can be accessed, for example, using one or more structured query language (SQL) query statements.

A concept hierarchy based on the structured and unstructured data can be created, at 210. The concept hierarchy can be comprised of one or more concepts connected by conceptual relationships, such as a parent concept/subconcept relationship. A concept in the concept hierarchy can be, for example, one or more words or phrases present in the content of an unstructured document from the set of structured and unstructured data. Alternatively, a concept in the concept hierarchy can be a value for a structured data element from the structured data, such as the value of a relational database field. Alternatively, a concept can be any combination of another concept, a structured data element, or the presence or absence of one or more words or phrases in the content of an unstructured data element.

A business rule can be defined based on the concept hierarchy, at 220. The business rule can be automatically generated by a software- or hardware-based module, similar to the business rule generator module described in connection with FIG. 1. Alternatively, the business rule can be defined by a user via a graphical user interface that allows for visual manipulation of the relationships between one or more concepts in the concept hierarchy and user entry of one or more logical rules. In some embodiments, one or more changes to a concept in the concept hierarchy can be detected by the above-mentioned software- or hardware-based module, with each change being propagated through all concepts and subconcepts that include the changed concept.

The business rule can be optionally be tested for accuracy by applying it to a known testing set of structured and unstructured data with known outcomes or characteristics, at 230. The tests can be defined, for example, by receiving user input signals indicating the selection of one or more data objects from the testing set of unstructured data to define a subset and subsequently receiving user input signals that indicate a correct outcome for the application of the business rule to the testing set. The test can be executed by, for example, executing the business rule on the testing set to produce a test output.

If the test output is incorrect, the business rule can be refined based on the test output, at 240. In some embodiments, the business rule can be refined by receiving one or more user input signals that edit the definition of the business rule. The updated business rule can be re-tested for accuracy, at 230, and this process of testing and refining can be repeated until a satisfactory test output is obtained and the user specifies completion of the testing and refining process.

The business rule can be executed on the set of structured and unstructured data to make a determination about the set, at 250. The executing can be performed at a software- or hardware-based module, similar to the determination module discussed in connection with FIG. 1. The executing can be performed, for example, by substituting each concept identifier in the business rule with a "true" or "false" signal (such as a 1 or 0), indicating the presence or absence of that concept in the set of structured and unstructured data. The executing can also include, for example, recursively evaluating low-level subconcepts in the business rule to evaluate higher-order portions of the business rule, until the entire business rule has been evaluated, yielding a determination, as discussed in connection with FIG. 7 below.

The determination can be output to a display, at 260. The determination can be a conclusion about the contents of the set of structured and unstructured data. In some embodiments, the determination can be a binary output, such as a "1" or "0" or a "yes" or "no" that indicates the presence or absence of a particular concept in the set of data. In some embodiments, the determination can be a recommendation for future action based on the contents of the set of data. The determination can be output, for example, in a readable language format, such as a declarative sentence in English or another language. In some embodiments, the determination can be output as a data code or in another alphanumeric format.

Figure 3:
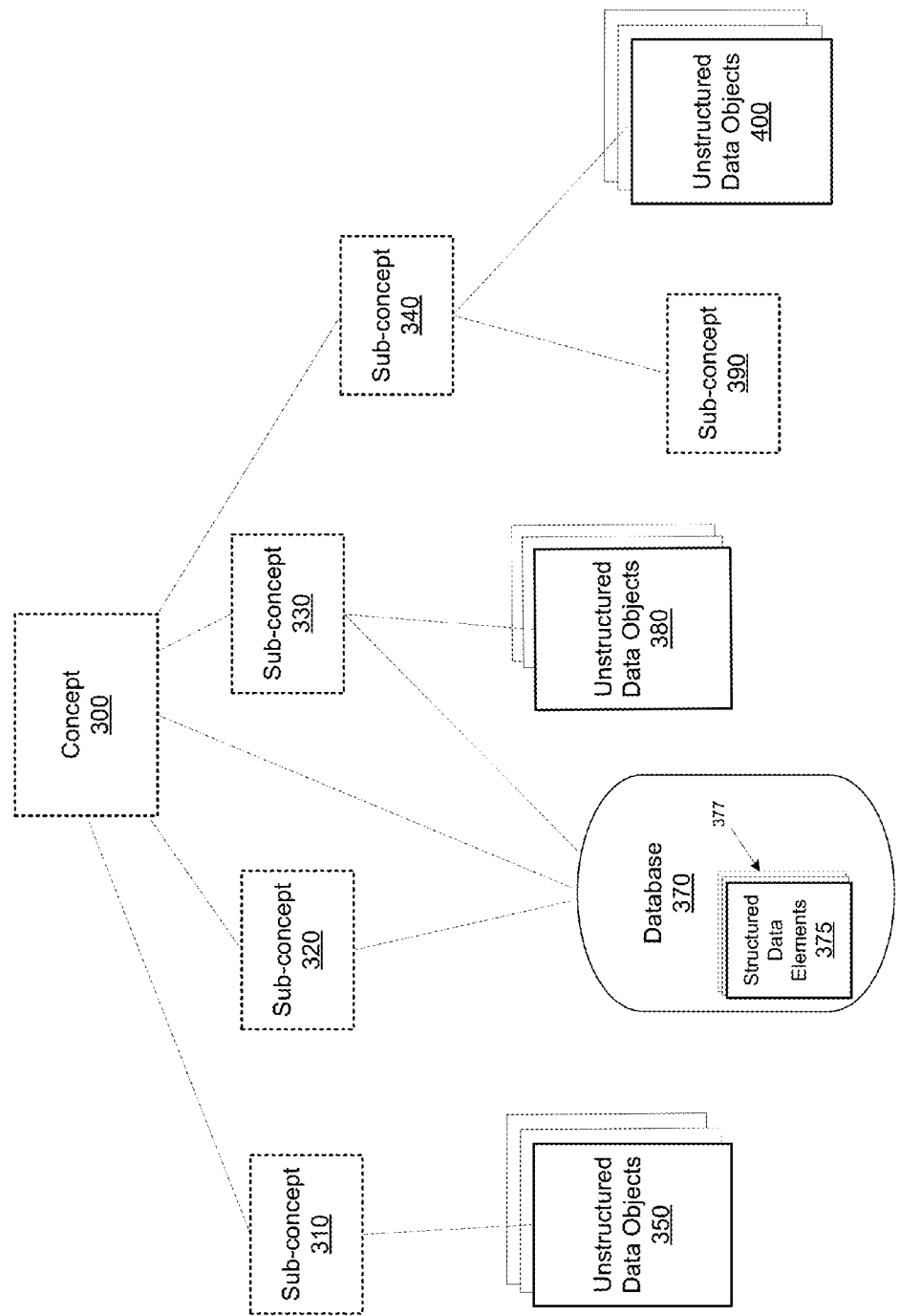
FIG. 3 is a schematic diagram that illustrates an exemplary concept comprised of a plurality of subconcepts based on structured and unstructured data, according to an embodiment.

FIG. 3 is a schematic diagram that illustrates an exemplary concept comprised of a plurality of subconcepts based on structured and unstructured data, according to an embodiment. Specifically, FIG. 3 illustrates a concept 300 comprised of a logical combination of subconcepts 310-340 and one or more structured data elements 375 from database 370, including structured data element 377. Subconcept 310 is comprised of the presence or absence of a text string in one or more unstructured data objects 350. Subconcept 320 is comprised of the presence or absence of a particular structured data element value (not shown) in database 370. Subconcept 330 is comprised of a logical combination of the presence or absence of the same structured data element value in the database 370 and the presence or absence of a text string in the group of unstructured data objects 380. Subconcept 340 is comprised of a logical combination of another subconcept 390 (definition not shown) and the presence or absence of a text string in an unstructured data object 400.

In some embodiments, the logical combination that defines the concept 300 can be an expression (not shown) that includes boolean and logical operators such as, for example, "AND", "OR", "NAND", "NOR", "XOR", "XNOR" and "NOT". In the example illustrated by FIG. 3, the expression logically combines the subconcepts 310-340 and structured data element 377. For example, the expression can be defined as: Concept 300=((Subconcept 310 OR Subconcept 320) AND structured data element 377 AND (Subconcept 330 XOR Subconcept 340)). Thus, per this expression, in the example the concept 300 is present when either Subconcept 310 or Subconcept 320 is present in the set of data, structured data element 377 has a specified value, and either—but not both—of Subconcept 330 and Subconcept 340 is present. Speaking generally, a concept such as concept 300 can be comprised of any combination of indicators of the presence or absence of particular structured data element values in a database, indicators of the presence or absence of a text string in an unstructured document (as defined by a regular expression), and/or subconcepts comprised of one or more of the same.

Figure 4:
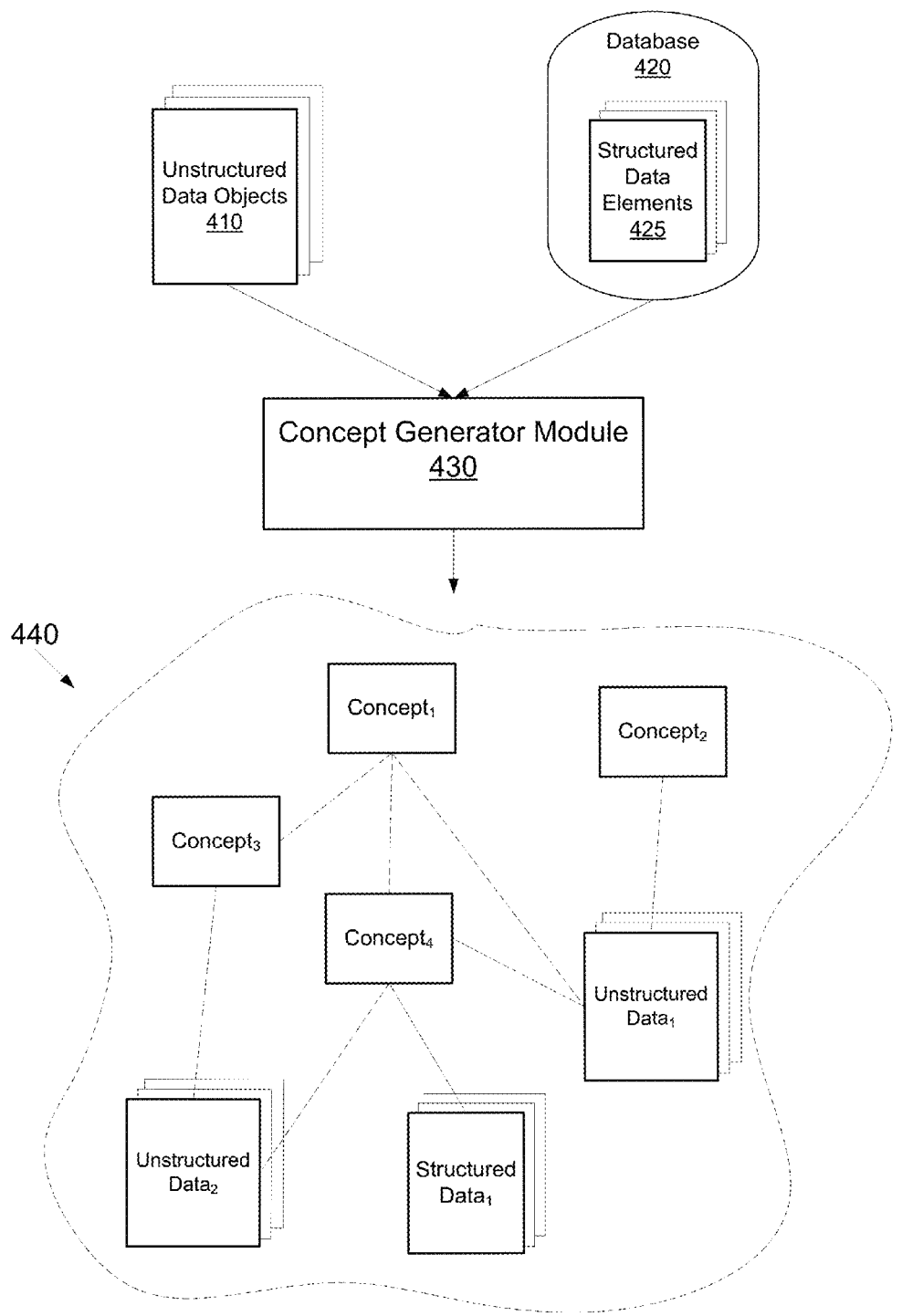
FIG. 4 is a schematic diagram that illustrates a concept generator module that receives unstructured and structured data and generates a concept hierarchy, according to an embodiment.

FIG. 4 is a schematic diagram that illustrates a concept generator module that receives unstructured and structured data and generates a concept hierarchy, according to an embodiment. Specifically, FIG. 4 illustrates concept generator module 430 that receives one or more unstructured data objects 410 and one or more structured data elements 425 stored in a database 420 to generate a concept hierarchy 440.

In some embodiments, the concept generator module 440 can programmatically extract concepts from the unstructured and structured data objects to create a concept hierarchy. In such an embodiment, the concept generator module can be similar to the analysis and categorization engine discussed in connection with U.S. Pat. No. 7,194,483 to Mohan et al, the disclosure of which is incorporated herein by reference in its entirety.

The concept hierarchy creation process can also include receiving user input to define one or more concepts from a set of structured data, such as a relational database. In some embodiments, the concept generator module 430 can be configured to prompt the user for input that defines one or more concepts based on one or more structured data fields from the structured data elements 425. For example, the concept generator module 430 can display to a screen a visual or textual representation of the structured data elements 425, such as fields of one or more tables from a relational database (not shown). The user can then be prompted to select one or more fields from a database table (not shown), input a target value for the field, and input a name for the concept. In some embodiments, this process can be repeated iteratively until the user has defined a desired number of concepts necessary to create an appropriate business rule (as discussed in connection with FIG. 6 described herein).

In some embodiments, the concept generator module 430 can additionally scan the text of the unstructured data objects 410 and extract a series of concepts. For example, the concept extraction process can include discovering one or more words or phrases present in the content of an unstructured data object and classifying the words or phrases as a concept, along with a title, name or label. In some embodiments, as detailed in connection with FIG. 5 below, the concept generator module 430 can be configured to generate a regular expression for the concept that can be used to determine the presence or absence of that concept in one or more unstructured documents, such as unstructured data objects 410.

In some embodiments, the concept generator module 430 can be configured to include one or more user-defined concepts in the concept hierarchy 440. The concept generator module 430 can be configured to receive the one or more user-defined concepts via direct user input, by importing a file that contains information associated with the user-defined concepts, or by accessing a database that contains the user-defined concepts. Additionally, in some embodiments the concept generator module 430 can be further configured to detect additional concepts over time. Thus, as the content and composition of the either the unstructured data objects 410 and/or the database 420 changes over time, the concept generator module 430 can be configured to continually discover new concepts present in the data and include them in subsequently-generated concept hierarchies.

After completion of the concept extraction process, the concept generator module 430 can be configured to organize the extracted and/or user-defined concepts into a concept hierarchy. In some embodiments, the organization process can include defining one or more parent-child relationships between the concepts to create a hierarchy of concepts. To define these parent-child relationships, the concept generator module 430 can be configured to employ a series of concept relationship discovery techniques. For example, the concept generator module 430 can utilize one or more techniques described in connection with U.S. patent application Ser. No. 10/695,426 to Mohan entitled "Concept-based method and system for dynamically analyzing results from search engines".

In some embodiments, the concept generator module 430 can employ alternative concept relationship discovery techniques, such as correlation analysis. To perform correlation analysis, the concept generator module 430 can be configured to analyze the unstructured data objects 410, the structured data elements 425, and the concepts extracted from the above, and execute a series of processes that discover a correlation between the presence of at least one concept and the presence of at least one other concept. For example, while performing concept correlation analysis, the concept generator module 430 can determine that, in worker's compensation insurance claim data, the presence of a concept named "pre-work accident" (defined, for example, by a structured data or unstructured data element that indicates that the time of injury is before the start of working hours) and the presence of a second concept named "no co-workers present" (defined, for example by a regular expression that determines the presence of the concept in an unstructured document related to the claim) are highly-correlated with claims associated with a fraudulent or suspect status (defined, for example by a status code in a set of structured data). In the example, the system can utilize this correlation to create part of a "suspicious claim" concept that combines these individual concepts to create a higher-level concept defined by a logical expression that represents the correlation between the concepts (as discussed in connection with FIG. 6 below).

In some embodiments, the concept generator module 430 can utilize the results of the above-described correlation analysis to combine concepts that are positively-correlated or have a close relationship within the data set used by the module to define the concept hierarchy 440 (as discussed in, for example, in U.S. patent application Ser. No. 10/695,426 to Mohan et al, the disclosure of which is incorporated herein by reference in its entirety). Referring again to the above-described example of a pre-work accident, the concept generator module could utilize a positive correlation of two factors associated with pre-work accidents to combine the concepts as at least a portion of a single concept. The concept generator module 430 can be configured to recursively perform the combination of positively-correlated concepts into fewer concepts within the concept hierarchy 440 until no two concepts within the concept hierarchy 440 that are positively-correlated are not defined within the same concept as one another. In other words, the module can recursively perform the concept combination process until none of the highest-level concepts defined in the concept hierarchy 440 are positively-correlated with one another in the data set. This process allows for the reduction of false positives produced by the determination process, as the existence of positively-correlated decision factors (concepts) does not inappropriately skew the decision calculus.

In some embodiments, one or more concepts in the concept hierarchy 440 can be programmatically refined by the concept generator module 430. Specifically, the concept generator module 430 can be configured to utilize one or more reference sources such as a dictionary and/or a thesaurus to refine the name or contents of one or more concepts in the concept hierarchy 440. Additionally, the concept generator module can be configured to programmatically detect additional relationships between the concepts in the concept hierarchy. The concept generator module can then optionally update the definition of the concept hierarchy to include the additional relationships.

In some embodiments, the concept generator module 430 can provide functionality that allows a user to edit the definition of one or more concepts in the concept hierarchy 440. For example, the concept generator module can output to a display (not shown) a visual representation of the concept hierarchy, and provide functionality whereby a user can send one or more input signals that indicate a desired change to the definition of one or more concepts. The concept generator module can be configured to receive the signals and effectuate the desired changes in the definition of the concept hierarchy.

In some embodiments, the concept generator module 430 can be configured to update the definition of a concept in the concept hierarchy 440 upon, for example, receipt of a signal from a user. The concept generator module 430 can additionally update a concept definition automatically in response to, for example, additional information detected within the data set, the addition of a user-defined concept to the concept hierarchy 440, or any other compositional change to the concept hierarchy. Upon completion of an update, the concept generator module can be configured to propagate the updated concept definition throughout all instances of that concept in the concept hierarchy (whether the instance of the concept be as an independent concept, as a subconcept of another, higher-level concept or within a regular expression).

In some embodiments, after completion by the concept generator module 430, the concept hierarchy can be stored in one or more electronic files or in a relational database for retrieval by or sending to a software- or hardware-based module similar to the business rule generator module discussed in connection with FIG. 6.

Figure 5:
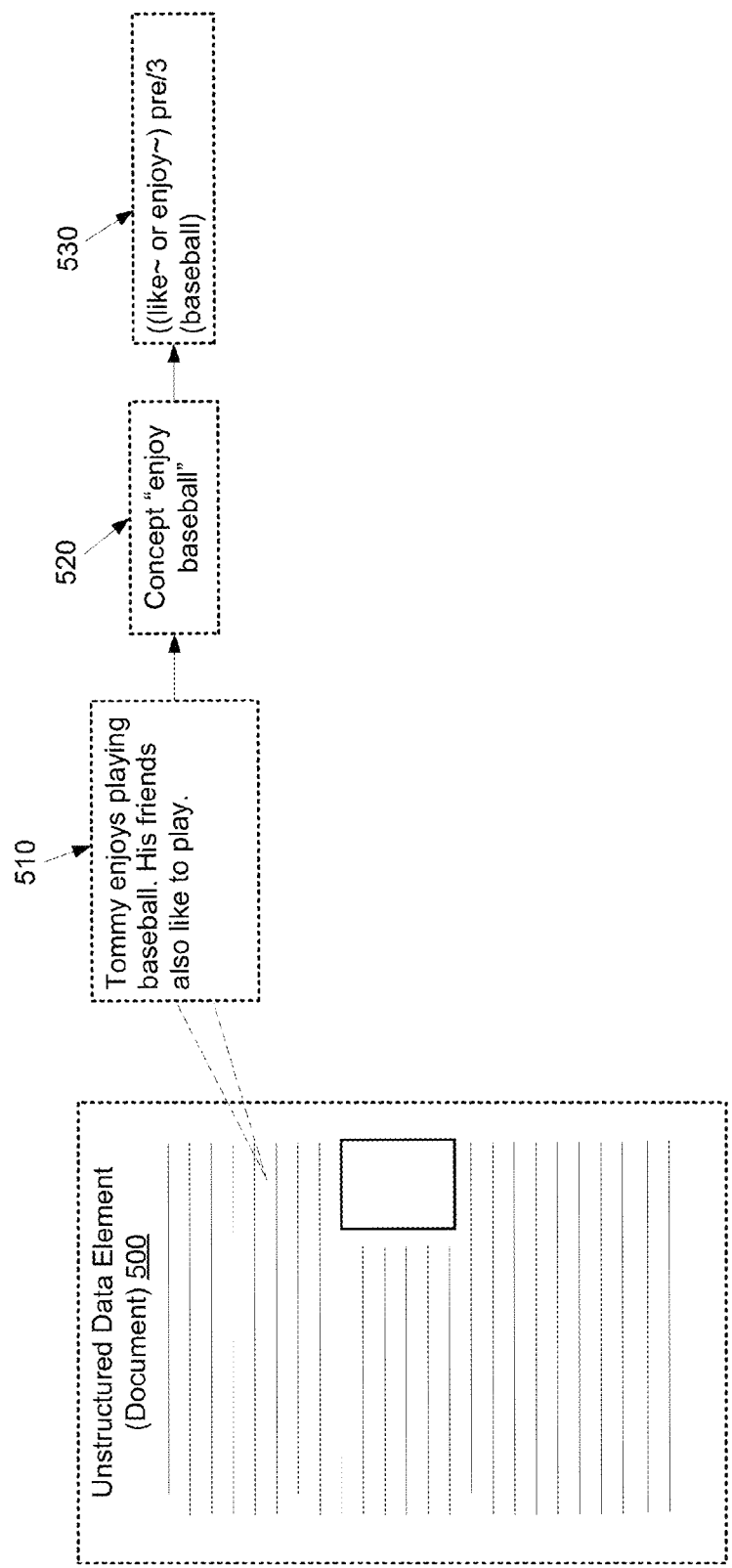
FIG. 5 is a schematic diagram that illustrates that a regular expression can be defined based on a concept present in an unstructured data object, according to an embodiment.

FIG. 5 is a schematic diagram that illustrates that a regular expression can be defined based on a concept present in an unstructured data object, according to an embodiment. More specifically, FIG. 5 illustrates an unstructured data object 500 that contains a text string 510, from which a concept 520 can be extracted. The presence or absence of the concept 520 can be represented in, for example, an expression such as regular expression 530.

As discussed in connection with FIG. 4, a concept can be defined as the presence or absence of a text string in an unstructured object or document, such as unstructured data object 500. The unstructured object 500 can be, for example, a collection of handwritten notes, a printed form, chart, table, or graph, or other printed document. Alternatively, the unstructured data object 500 can be any document that contains text in electronic form, such as a word processor document, an e-mail, a text file, an Adobe PDF document, a web page, or other electronic file that contains text.

As discussed in connection with FIG. 4, a software- or hardware-based module such as a concept generator module can be configured to scan an unstructured data object such as unstructured data object 500 and extract one or more concepts from its text content. For example, as shown in FIG. 5, a portion of the text content can be one or more words or phrases, such as text string 510, "Tommy enjoys playing baseball. His friends also like to play." In this example, during the concept extraction process, the concept generator module scans the text of the unstructured data object 500, including the text string 510. Upon scanning the text string 510, the concept generator module extracts the concept 520, labeled "likes baseball". To allow the presence or absence of the concept 520 to be determined during execution of a business rule that includes the concept 520 (discussed in connection with FIG. 7 below), the concept generator module creates regular expression 530.

Those skilled in the art will be familiar with the creation and evaluation of regular expressions such as regular expression 530. In this example, regular expression 530 is defined by the statement: "(like~ or enjoy~) pre/3 (baseball)", which represents the notion of any word beginning with the letters "like" or "enjoy" existing in a portion of text within three words before the word "baseball". Thus, exemplary text strings satisfying this regular expression—i.e., for which the regular expression would evaluate in the affirmative to indicate presence of the concept 520—are: "I'm currently enjoying watching baseball", or "Many Americans like playing baseball in the spring." In some embodiments, the regular expression 530 can include one or more additional operators such as an operator that detects the presence of a word within "x" words (expressed "w/x"; e.g., "w/5" means "within five words") or an operator that detects the presence of a word within "x" words before (expressed "pre/x"; e.g., "pre/5" means "within five words before"). In some embodiments, the regular expression 530 can include an operator that detects the presence of a pattern of characters within the same sentence (expressed "s/s"; e.g., "ball s/s team" means "ball appearing within the same sentence as team") or within the same paragraph (expressed "p/s"; e.g., "ball p/s team" means "ball appearing within the same paragraph as team"). The regular expression 530 can further include an operator that denotes a wildcard character (such as the characters "*", "?", and "="), or any other standard regular expression operator, which are generally known to those skilled in the art.

In some embodiments, the regular expression 530 can be included as part of a concept hierarchy, such as the concept hierarchy discussed in connection with FIG. 4. In some embodiments, a regular expression such as regular expression 530 can be included with one or more other regular expressions that represent the presence or absence of a concept in a set of unstructured data objects, or the presence or absence of a particular data value in a set of structured data, as part of defining a higher-level concept such as the concept discussed in connection with FIG. 3.

Figure 6:
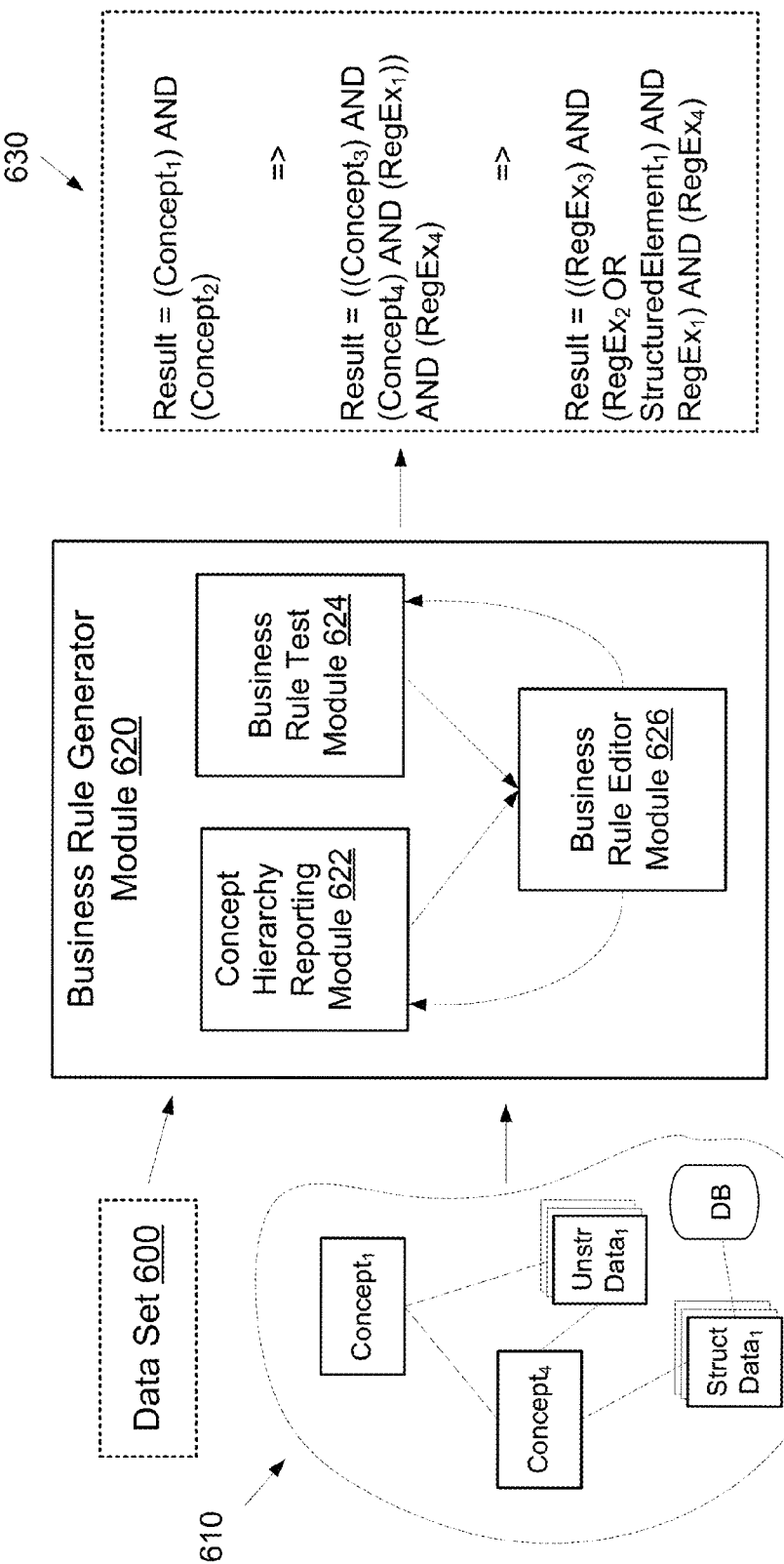
FIG. 6 is a schematic diagram that illustrates a business rule generator module, according to an embodiment.

FIG. 6 is a schematic diagram that illustrates a business rule generator module, according to an embodiment. Specifically, FIG. 6 illustrates a business rule generator module 620 that receives both a data set 600 and data that defines a concept hierarchy 610, and generates data that includes a completed business rule 630, according to an embodiment. The business rule generator module 620 includes a concept hierarchy reporting module 622, a business rule test module 624, and a business rule editor module 626.

In some embodiments, the business rule generator module 620 receive data that includes a concept hierarchy 610 from a software or hardware-based module, such as the concept generator module discussed in connection with FIG. 4. In some embodiments, the business rule generator module 620 can data that defines the concept hierarchy 610 via a removable storage medium such as an optical disc, an external hard disk drive, or a flash memory module.

Upon receipt of the concept hierarchy 610, the business rule generator module 620 can be configured to generate a completed business rule 630. More specifically, in some embodiments the business rule generator module 620 can be configured to output to a display a visual representation of the concept hierarchy 610 and provide functionality that allows a user to define a business rule associated with the concept hierarchy. For example, the business rule definition functionality can include an area of a display that allows a user to use input devices to select one or more concepts from the concept hierarchy and define logical relationships between the concepts. In some embodiments, the functionality can include a text input field that allows a user to enter at least a portion of a business rule using a text input device, such as a computer keyboard (not shown).

In some embodiments, the visual display of the concept hierarchy 610 can include one or more reports generated by the concept hierarchy reporting module 622. The reports can include, for example, information associated with the concept hierarchy 610, such as information about positive correlations between the presence of certain data in a portion of the data set 600 and the presence of certain concepts within that same portion. These correlations can be used by the user to, for example, detect patterns and logical relationships within the data that can be included in the created business rule to improve the rule's predictive accuracy.

In some embodiments, once the user has defined an initial business rule, the rule can be sent to the business rule test module 624. The business rule test module 624 can be configured to test business rule accuracy by receiving the business rule and executing it on a set of test data with known outcomes. In some embodiments, the business rule test module can receive an input signal from the user that indicates the location of the test data and the correct outcomes for that test data. The business rule test module 624 can be configured to test the received business rule by executing it on the test data, and subsequently display results of the test to a display device.

After completion of the test, the business rule test module 624 can be configured to return focus to the business rule editor module 626. If the results of the above test are satisfactory to the user, the user can choose to accept the tested business rule. If the results of the test are unsatisfactory, the business rule editor module 626 can be configured to receive additional user inputs signals that indicate one or more desired changes to the rule. This process of receiving user input signals that indicate a desired change to the rule, followed by testing of the rule using the business rule test module 624, can be performed iteratively until the business rule editor module receives an input signal from the user that indicates completion of the business rule generation process.

In some embodiments, the business rule editor module 626 can allow a user to edit a business rule over time, as the composition and/or content of the underlying data that comprises data set 600 changes. The business rule generator module 620 can be further configured to access one or more additional sources of structured and unstructured data (not shown) and allow the user to refine the business rule by analyzing and running tests on the additional data.

The completed business rule can be a logical combination of one or more concepts, as depicted in completed business rule 630 of FIG. 6. In some embodiments, the completed business rule can include one or more relationships between the concepts based on a mathematical relationship between the concepts or a relationship based on a linguistic grammar.

For clarity, completed business rule 630 illustrates the expansion of that business rule into its component parts. In the illustrated example, $Concept_1$ is defined as the logical combination of the presence of $Concept_3$, $Concept_4$, and $Regular Expression_1$. $Concept_2$ is composed of $Regular Expression_4$. $Concept_3$ is itself composed of the $Regular Expression_3$, and $Concept_4$ is composed of the logical combination of $RegularExpression_2$ or $StructuredElement_1$, where $StructuredElement_1$ represents an expression that determines the presence or absence of a specified value in structured data included from the data set 600.

In another example, four concepts (labeled C1, C2, C3, and C4, respectively) can represent four factors that, if all present for the same automobile insurance claim, indicate that the claim may be fraudulent. The factors are: that the automobile in question is less than seven years old (concept created from a structured data element stored in a state automobile registration database; labeled C1), that the automobile was stolen (concept created from a structured data element stored in the insurance company's claim database; labeled C2), that the keys were removed from the ignition during the incident (concept extracted from the text of a scanned police incident report or from a structured data element; labeled C3), and that the automobile was vandalized (concept extracted from claim adjustor notes converted into computer text by optical character recognition (OCR); labeled C4). To represent a concept for the type of fraudulent claim associated with these factors, a user can define a logical relationship between these four concepts, such as: Fraudulent Claim=(C1 AND C2 AND C3 AND C4), where each concept label included in the expression represents the presence of that concept in data.

In some embodiments, the business rule generator module 620 can be configured to store information associated with the completed business rule 630 in a memory for later use.

Additionally, the business rule generator module 620 can be configured to send data that includes the completed business rule 630 to another software- or hardware-based module for execution on a data set (as discussed in connection with FIG. 7 below).

Figure 7:
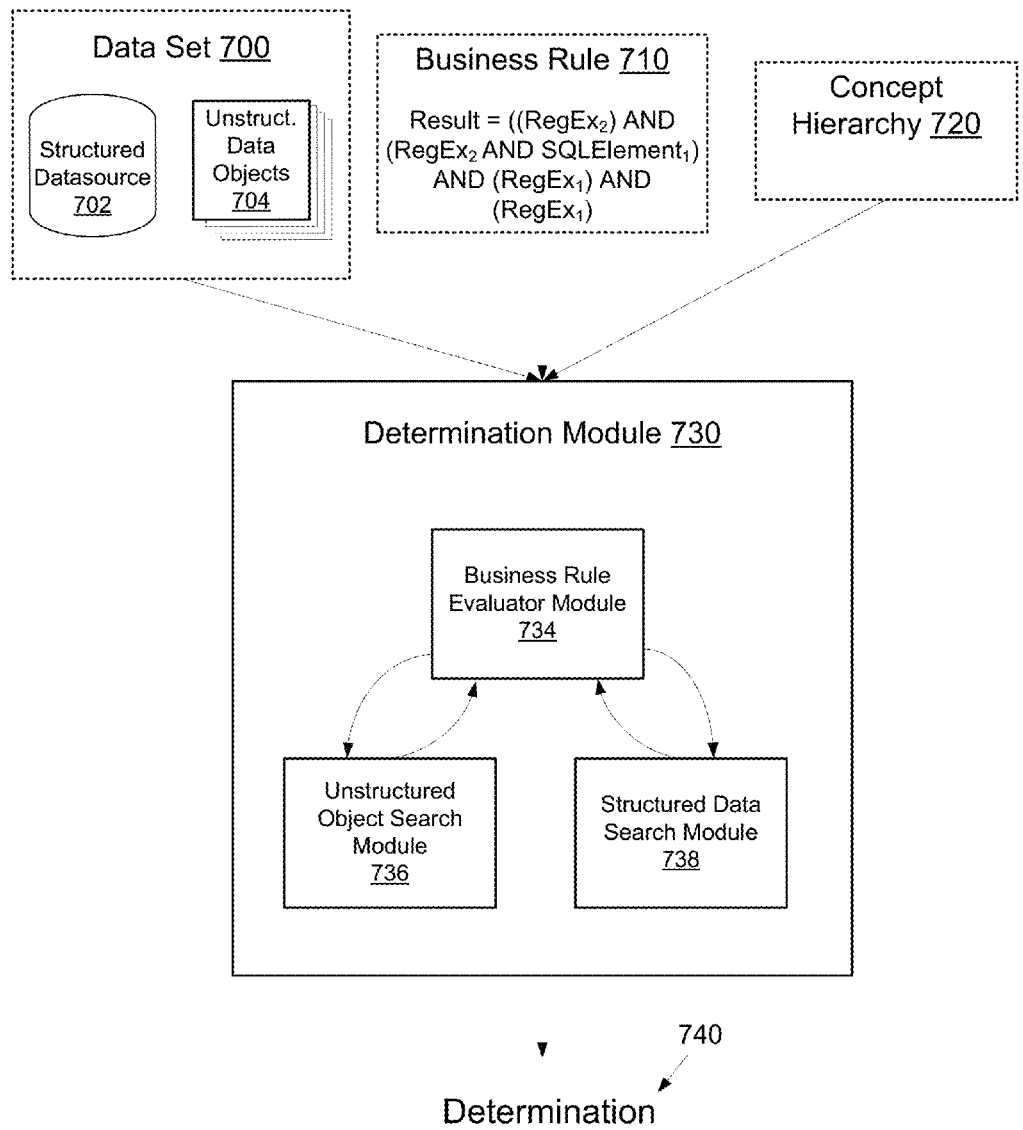
FIG. 7 is a schematic diagram that illustrates a determination module that generates a determination about a set of structured and unstructured data, based on a business rule, according to an embodiment.

FIG. 7 is a schematic diagram that illustrates a determination module that generates a determination about a set of structured and unstructured data, based on a business rule, according to an embodiment. Specifically, FIG. 7 illustrates a determination module 730 that receives a data set 700 and data that includes a business rule 710 and a concept hierarchy 720, and outputs a determination 740. In the illustrated embodiment, data set 700 includes a structured data source 702 and one or more unstructured data objects 704. Determination module 730 includes a business rule evaluator module 734, an unstructured object search module 736, and a structured data search module 738.

The business rule 710 can be a stored in a memory (e.g., a RAM, a ROM, a hard disk drive, an optical drive, or other removable media; not shown) connected via a network to the determination module 730. In some embodiments, the memory can reside on the same hardware device as the determination module 730. In some embodiments, the business rule 710 can be stored in a removable storage medium such as an optical disc, an external hard disk drive, or a flash memory module and transferred onto the hardware device on which the determination module 730 resides. The business rule 710 can include information associated with a business rule, similar to the completed business rule discussed in connection with FIG. 6 above.

As illustrated in FIG. 7, the determination module can receive a data set 700 and data that includes a business rule 710. Upon receipt of the data set and business rule, the determination module can generate a determination about the data set by executing the business rule on the data set. In the illustrated example, the determination module 730 utilizes the business rule evaluator module 734 to parse the business rule 710. In some embodiments, the evaluation can include expansion of the business rule 710 into its component parts by reference to the concept hierarchy 720.

Upon completion of the parsing process, the business rule evaluator module 734 can be configured to apply the contents of data set 700 to the expanded version of the business rule 710 and generate a determination 740. Specifically, the business rule evaluator module 734 can send data to and receive data from the unstructured object search module 736 and the structured objected search module 738. The unstructured object search module 736 can be configured to search the data set 700 for a particular text string as dictated by a portion of the expanded business rule 710 currently being processed by the business rule evaluator module 730. Similarly, the structured data search module 738 can be configured to search the data set 700 for a particular structured data value as dictated by a portion of the expanded business rule 710 currently being processed by the business rule evaluator module 734. After detecting the presence or absence of the searched-for information, each of the unstructured object search module 736 and structured data search module 738 can send a signal to the business rule evaluator module 734 that includes an indication of the presence or absence of that information in the data set 700. This process can be repeated for each portion of the expanded business rule 710.

Upon receipt of all necessary information from unstructured object search module 736 and structured objected search module 738 regarding the presence or absence of each concept from the expanded business rule in the data set 700, the business rule evaluator module 734 can be configured to logically evaluate the extracted business rule to compute a determination 740.

In some embodiments, the determination module 730 can be configured to send text or data associated with the determination 740 to an output device, such as a display (not shown). In some embodiments, the business rule evaluator module 734 can be configured to store information associated with the determination 740 to a memory and/or send the information to another hardware- or software-based module connected, for example, via a network.

Figure 8:
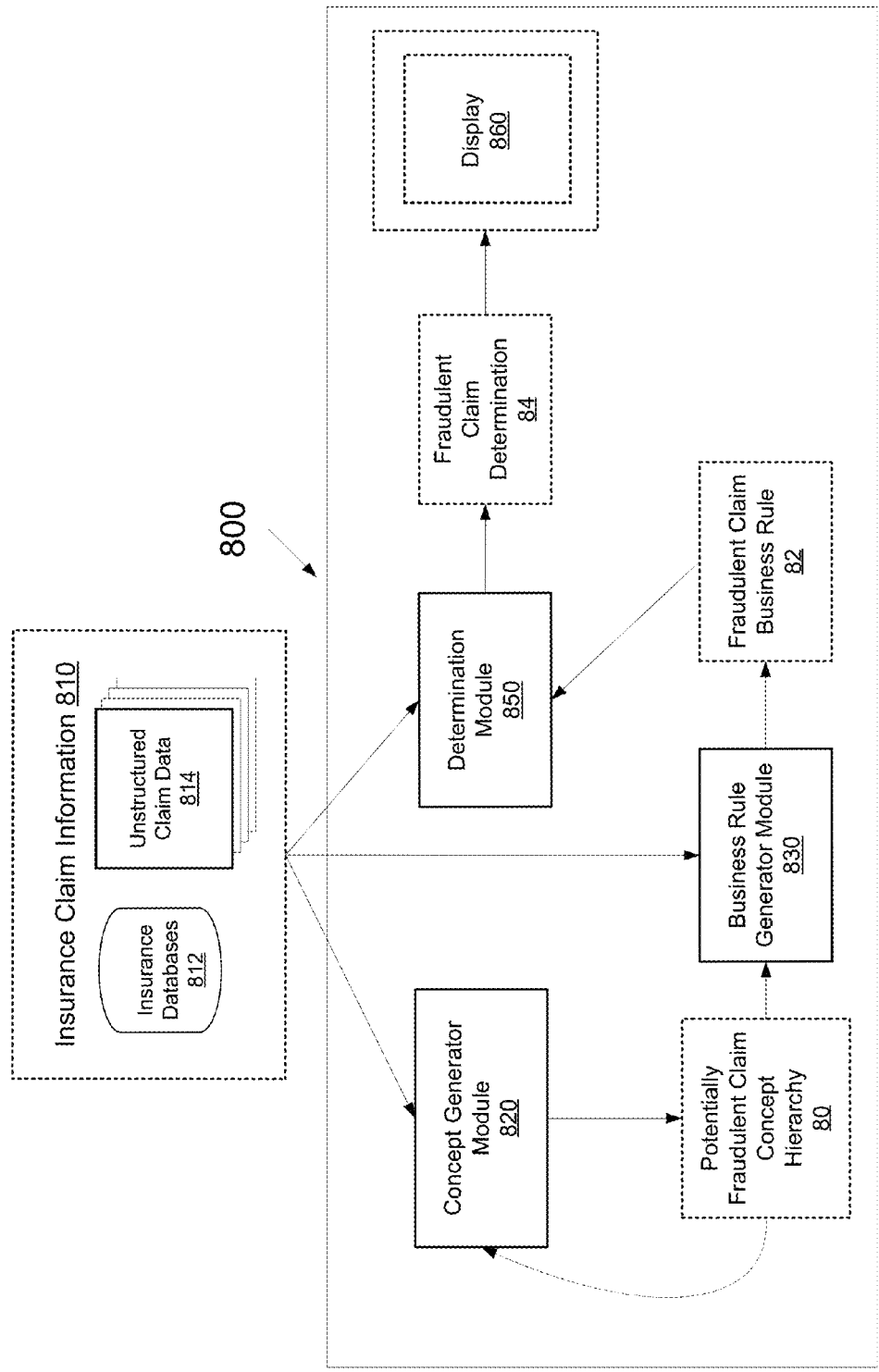
FIG. 8 is a schematic diagram that illustrates an exemplary software-based embodiment of a computerized decision system configured to make a determination relating to potentially fraudulent automobile insurance claims.
Figure 9:
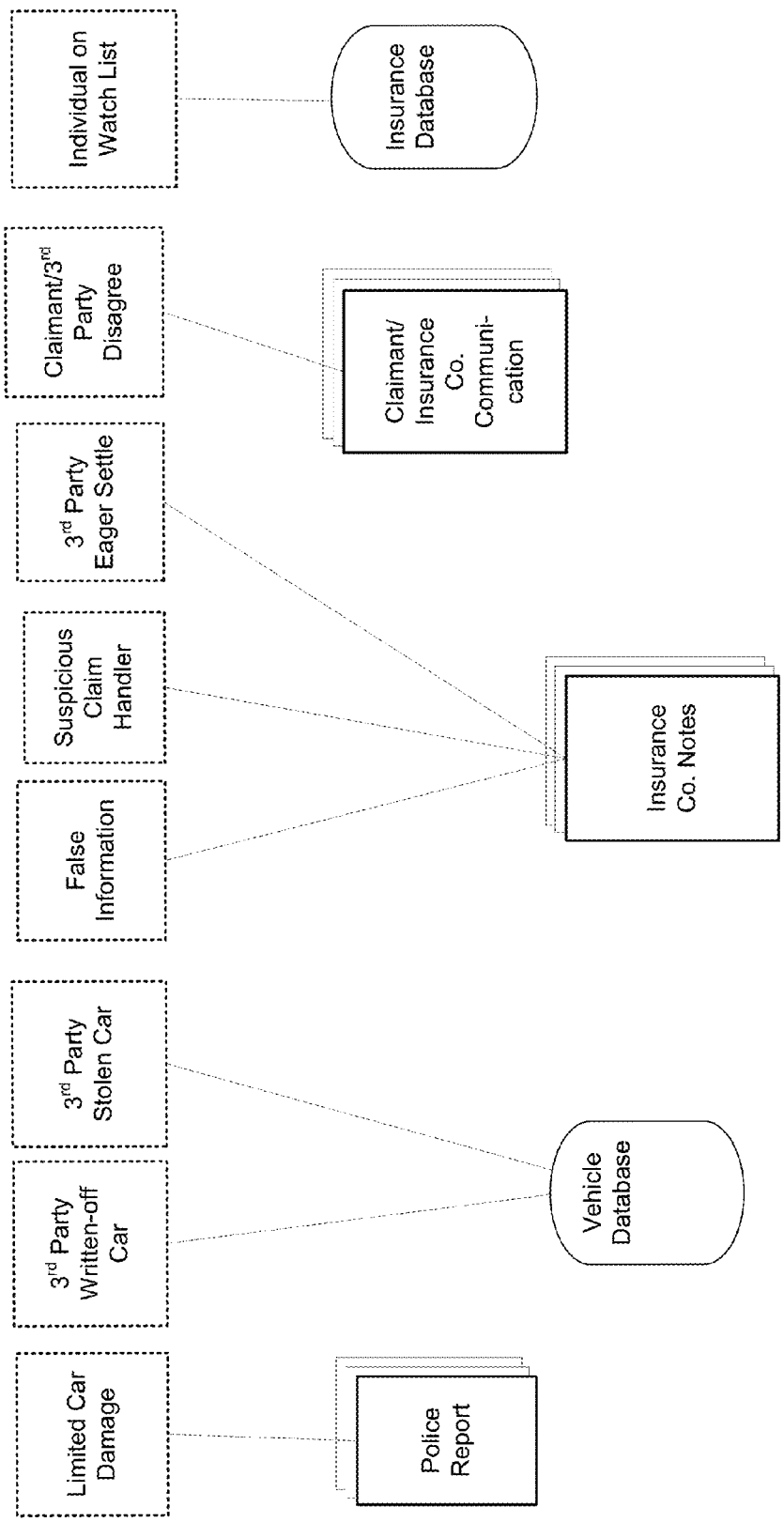
FIG. 9 is a schematic diagram that illustrates an exemplary concept hierarchy associated with the set of structured and unstructured data discussed in connection with FIG. 8.

FIGS. 8-10 illustrate an example usage case of the above-described invention, according to an embodiment. Specifically, FIG. 8 is a schematic diagram that illustrates an exemplary software-based embodiment of a computerized decision system configured to make a determination that relates to automobile insurance claims. The exemplary decision system 800 operates on a set of automobile insurance claim information to make a determination about a claim, in particular whether the claim appears fraudulent. The software-based decision system is implemented on a computer hardware device that includes a display and at least one peripheral for user input, such as a computer keyboard, touch screen, or computer mouse (not shown).

In the example, the concept generator module 820, business rule generator module 830, and determination module 850 are software-based modules that reside on a single hardware device. The insurance claim information 810 resides on multiple hardware devices that contain the insurance databases 812 and unstructured claim data objects 814. In the example, the insurance claim information is accessed by the concept generator module 820 and determination module 850 over a local area network connection. Display 860 is connected to the hardware device via a video output cable.

The insurance databases 812 contain structured data associated with one or more automobiles, drivers, and automobile insurance incident claims, including automobile information (e.g., vehicle identification (VIN) numbers, make, model, model year, color, vehicle type, incident history, etc.), driver/claimant data (e.g., age, ethnicity, gender, and other relevant demographic information), driver's license and driving record data, and claim information (e.g., incident date, incident time, weather conditions at time of incident, collision type, claim date, claim amount, etc.). The unstructured claim data 814 consists of electronic versions of documents that contain information relevant to the claim, such as claim adjustor notes, insurance company letters and memos, attorney communications, news articles, garage and repair bills, medical notes, recorded calls and voice messages converted to text, and claimant-company communication.

In the example, concept generator module 820 receives information about one or more automobile insurance incident claims included in insurance claim information 810 over a local area network. In the example, the concept generator module 820 generates a potentially fraudulent claim concept hierarchy 80 based on the insurance claim information, implementing a method similar to that discussed in connection with FIG. 4 above. After completion of user-defined edits to the concept hierarchy, the concept generator module sends data that defines the concept hierarchy to business rule generator module 830. In the example, potentially fraudulent claim concept hierarchy 80 is illustrated by the concept hierarchy in FIG. 9, which is a schematic diagram that illustrates an exemplary concept hierarchy associated with the set of structured and unstructured data discussed in connection with FIG. 8. While the concepts included in the concept hierarchy illustrated by FIG. 9 are all single-level concepts (containing no subconcepts), it should be clear from the above-described invention that a concept can be comprised of any number and combination of the presence or absence of a structured data value, presence or absence of a text string, or other concept, to any level of inheritance (i.e., concepts comprised of subconcepts, themselves comprised of sub-sub-concepts, and so forth).

Referring back to FIG. 8, the business rule generator module 830 defines a business rule based at least in part on user-defined logical relationships between multiple user-selected concepts. In the example, a business rule is created to determine if an automobile insurance claim is potentially fraudulent. Thus, the business rule contains a logical relationship that tests for the presence of concepts that indicate such a likelihood. In the example, these concepts represent eight fraudulence factors, and are labeled C1-C8. The eight factors (each with a description of the corresponding concept's likely data source) are:

1. There is limited damage to the automobile (found in police or insurance company reports)
2. At the time of the incident, a third party was driving an automobile that had been written off in a prior accident (found in vehicle database)
3. At the time of the incident, the third party was driving a stolen automobile (found in vehicle database) and third party could not show proper registration (found in police notes)
4. The claimant has provided false information (found in police or insurance company notes)
5. The claim handler is suspicious (found in insurance company notes)
6. The third party is eager to settle the claim (found in insurance company notes)/reports
7. The claimant adamantly disagrees with the third party's description of the incident (found in claimant communication with insurance company)
8. One or more individuals involved in the incident is on a watch list of suspect individuals (found in insurance or police database)

The presence of any of these factors for a given claim makes that claim potentially fraudulent. Accordingly, this fact can be represented by a single logical expression, which constitutes fraudulent claim business rule 82: Potentially_Fraudulent_Claim=(C1 OR C2 OR C3 OR C4 OR C5 OR C6 OR C7 OR C8) (where each concept in the expression represents the presence of that concept in the examined data).

The business rule generator module 830 then executes the business rule on a set of test data and outputs to the display results of the test to indicate the accuracy of the defined business rule. In the example, the set of test data is a subset of the insurance claim information 810 known to include fraudulent claims. Upon completion of one or more iterations of user edits to the business rule and subsequent tests for accuracy, the business rule generator module sends data that includes the fraudulent claim business rule 82 to the fraudulent claim determination module 850.

FIG. 10 is a word diagram that illustrates the exemplary business rule 82 generated by the exemplary computerized decision system discussed in connection with FIG. 8. Specifically, FIG. 10 illustrates a collapsed version of the business rule discussed in connection with FIG. 8 (labeled 1010) and an expanded version of the same business rule (labeled 1020). As shown in business rule 1010, Potentially_Fraudulent_Claim is defined as the presence of any of the eight fraudulent claim concepts in a set of structured and unstructured data.

Referring back to FIG. 8, the determination module 850 receives data that includes the fraudulent claim business rule 82 ("business rule" for further purposes of this example). Additionally, the determination module accesses the insurance claim information 810. In the example, the determination module executes the business rule 82 on the insurance claim information 810 to calculate a fraudulent claim determination 84. More specifically, the determination module parses the text of the business rule and reads the insurance claim information 810 to detect the presence or absence of each concept included in the business rule. Upon completion of the reading, the determination module evaluates the logic of the business rule, utilizing the search results to calculate the fraudulent claim determination 84 (a value of "true" or "false"). Upon completion of the calculation, the determination module 850 displays information associated with the fraudulent claim determination to the display (not shown), such as "Claim #1234567 appears to be fraudulent".

Figure 11:
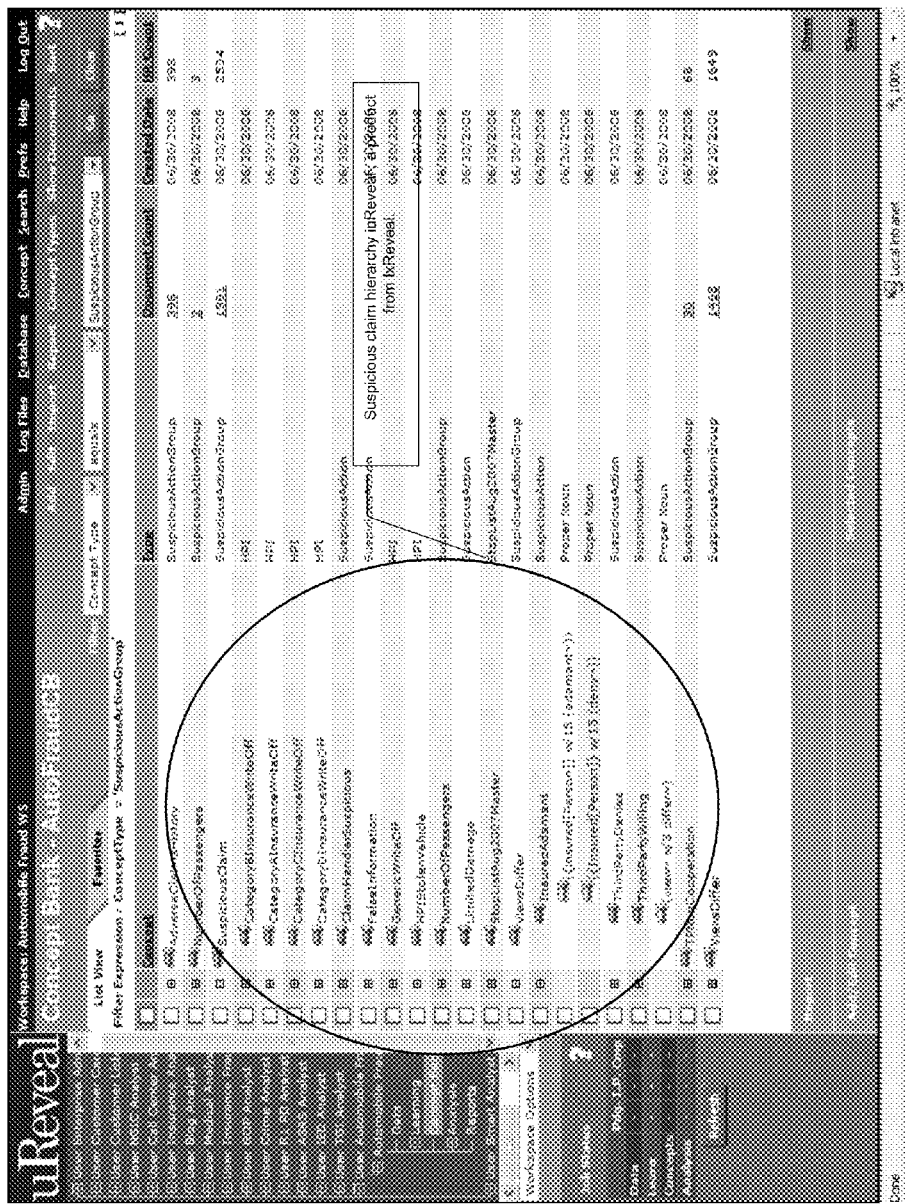
FIG. 11 is a software implementation screenshot that illustrates a visual representation of a concept hierarchy associated with automobile insurance claims.
Figure 12:
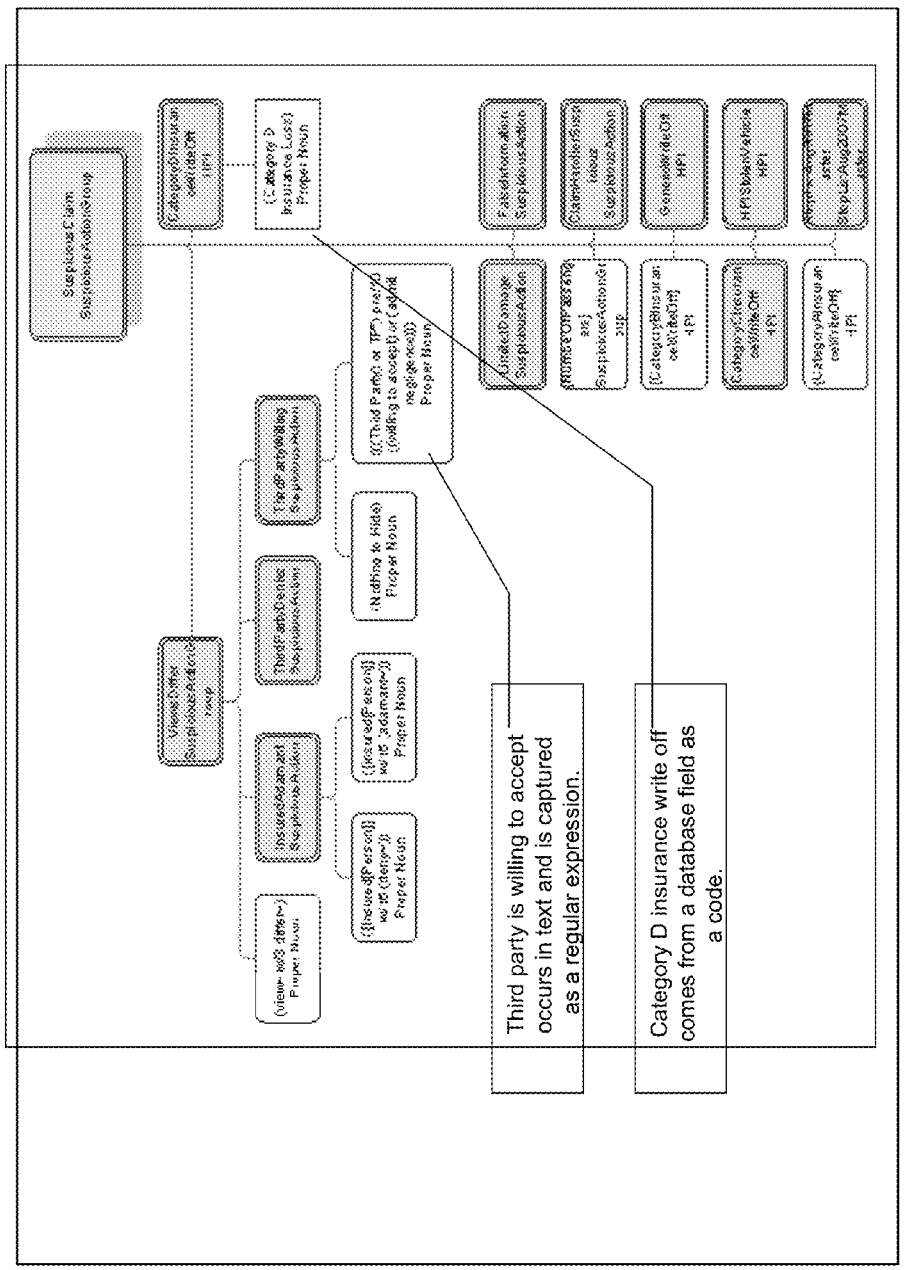
FIG. 12 illustrates a portion of the concept hierarchy described in connection with FIG. 11.
Figure 13:
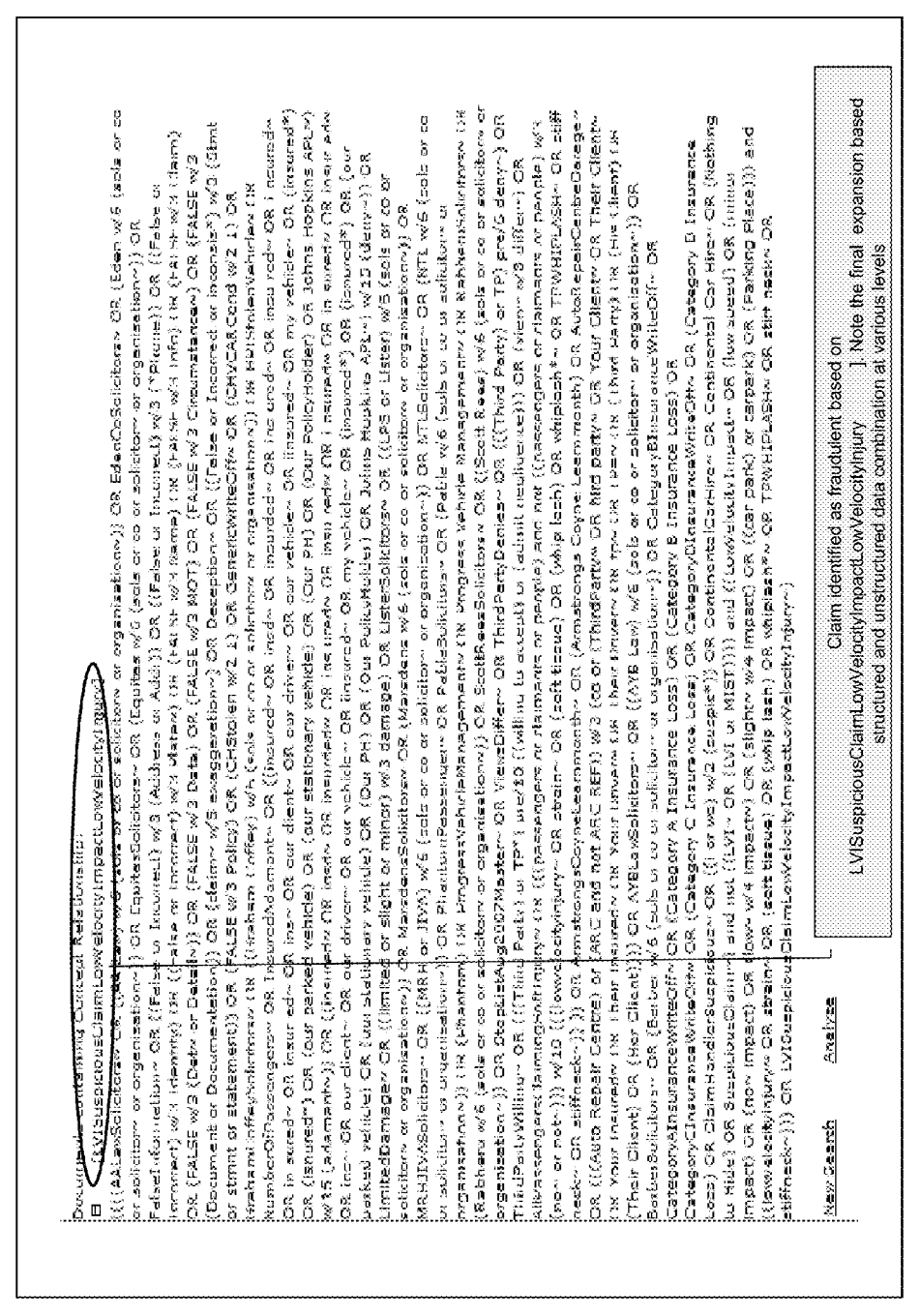

FIGS. 11-13 are diagrams that illustrate an implementation of the above-described invention associated with the detection of suspicious and/or fraudulent automobile insurance claims, according to an embodiment. Specifically, FIGS. 11-13 illustrate a software-based implementation of the invention similar to the uReveal product created by IxReveal, Inc. FIG. 11 is a software implementation screenshot that illustrates a visual representation of a concept hierarchy associated with automobile insurance claims.

In particular, FIG. 11 illustrates a graphical, hierarchical representation of a concept labeled "SuspiciousClaim", which is comprised of multiple subconcepts, including a concept labeled "ViewsDiffer", which itself is comprised of three subconcepts (labeled "InsuredAdamant", "ThirdPartyDenies", and "ThirdPartyWilling") and a regular expression defined to detect the presence of any word beginning with "view" that occurs within three words of any word beginning with "differ" in an unstructured data object.

FIG. 12 illustrates a portion of the concept hierarchy described in connection with FIG. 11 above. Specifically, FIG. 12 is a schematic blog diagram that illustrates the component parts of the "SuspiciousClaim" concept also discussed in connection with FIG. 11. For reference, FIG. 12 is analogous to FIG. 3 discussed above.

FIG. 13 illustrates a business rule designed, when applied to a set of data, to produce a determination as to whether an automobile claim included in the data is suspicious. This determination is based at least in part on whether the incident associated therewith included a low-velocity impact and an unusually severe injury given the low velocity of the impact. As shown in FIG. 13, the business rule includes multiple subconcepts that are associated with a suspicious automobile claim, and one or more regular expressions defined to detect the presence or absence of each subconcept in a set of data. Additionally, the business rule includes multiple logical operators that logically connect the concepts in a manner consistent with a user's conception of how the occurrence of those concepts is correlated in actual suspicious and/or fraudulent automobile insurance claims. For reference, FIG. 13 is analogous to FIG. 10 discussed above, which illustrates a simplified version of a business rule defined to determine whether an automobile claim is potentially fraudulent.

Some embodiments described herein relate to a computer storage product with a computer-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files that contain higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method, comprising:
    defining a first concept based on a first set of structured and unstructured data objects, the first concept including a first seed concept and at least one first related concept and being defined by a first regular expression indicating (1) a presence of a text string in an unstructured data object from the first set and (2) a data code stored in a structured data object from the first set;
    defining a second concept based on a second set of structured and unstructured data objects, the second concept including a second seed concept and at least one second related concept and being defined by a second regular expression indicating (1) a presence of a text string in an unstructured data object from the second set and (2) a data code stored in a structured data object from the second set, wherein the first concept is not positively correlated with the second concept;
    defining a business rule to include a third regular expression indicating (1) the presence or absence of a text string indicative of at least one of the first concept or the second concept in an unstructured data object from the first set or from the second set and (2) the presence or absence of data code indicative of at least one of the first concept or the second concept in a structured data object from the first set or from the second set;
    applying the business rule to a third set of structured and unstructured data objects to make a prediction indicative of whether the third set satisfies the business rule; and
    outputting to a display information associated with the prediction.

2. The method of claim 1, wherein the first set of structured and unstructured data objects and the third set of structured and unstructured data objects are disjoint sets.

3. The method of claim 1, wherein the third set of structured and unstructured data objects is a subset of the first set of structured and unstructured data objects.

4. The method of claim 1, wherein the first concept is included in a first set of concepts, the defining the first concept is performed at a first time, further comprising:
    detecting, at a second time, a presence of one or more new concepts in the first set of structured and unstructured data objects that were not present in the first set of structured and unstructured data objects at the first time; and
    updating the first set of concepts to include the one or more new concepts.

5. The method of claim 1, wherein the first concept is included in a first set of concepts, the second concept includes one or more concepts from the first set of concepts.

6. The method of claim 1, wherein the defining a first concept includes defining a concept hierarchy based on the first concept.

7. The method of claim 1, further comprising:
    refining the first concept using one or more of:
        a thesaurus;
        a dictionary; and
        a language relationship.

8. The method of claim 1, wherein the second relationship can also include one of:
    a logical relationship;
    a mathematical relationship; and
    a relationship based on a linguistic grammar.

9. A method, comprising:
    defining a first concept based on a first set of structured and unstructured data objects;
    defining a second concept based on the first set, the definition of the second concept based at least in part on at least one structured data element from the first set and at least one unstructured data element from the first set;
    defining a third concept based on a second set of structured and unstructured data objects;
    defining a fourth concept;
    defining a relationship between the first concept and the second concept, the relationship specifying that the second concept is a subconcept of the first concept;
    defining a relationship between the second concept and the third concept, the relationship specifying that the second concept is a subconcept of the third concept;
    defining, at a first time, a business rule to include a regular expression indicative of a logical relationship between the first concept, the third concept, and the fourth concept;
    redefining, at a second time after the first time, the business rule to (1) include a regular expression indicative of a logical relationship between the first concept and the third concept and (2) exclude the fourth concept based on a positive correlation between the fourth concept and one of the first concept or the third concept; and
    executing the business rule on a third set of structured and unstructured data objects, the executing including (1) a first determination of a presence of the first concept in the third set, the first determination including a second determination of a presence of the second concept in the third set, and (2) a third determination of a presence of the third concept in the third set, the third determination including a fourth determination of a presence of the second concept in the third set; and
    making a prediction indicative of whether the third set satisfies the business rule, the prediction based on the first determination and the third determination; and
    outputting to a display information associated with the prediction.

10. The method of claim 9, wherein the business rule includes one or more component parts, each component part being one of:
- a regular expression for determining a presence or absence of a concept in an structured or unstructured data object; and
- a data code indicating presence or absence of a concept in a structured data object, wherein the executing the business rule includes executing the one or more component parts.

11. The method of claim 9, wherein the first set of structured and unstructured data objects and the third set of structured and unstructured data objects are disjoint sets.

12. The method of claim 9, wherein the third set of structured and unstructured data objects is a subset of the first set of structured and unstructured data objects.

13. The method of claim 9, wherein the first concept or the second concept is a user-defined concept.

14. A method, comprising:
- retrieving a concept hierarchy, the concept hierarchy including a first concept, a second concept, and a third concept, the first concept based at least in part on a first set of structured and unstructured data objects;
- receiving a first plurality of user input signals, each signal from the plurality of user input signals indicating a selection of one or more of the first concept, the second concept or the third concept;
- outputting information associated with the first concept, the second concept and the third concept to a display, wherein the first concept and the third concept are not positively correlated;
- receiving a second plurality of user input signals that (1) defines a first logical relationship that is between the first concept and a second concept, the first logical relationship based on a first regular expression indicating (a) a presence of a text string in an unstructured data object the first set or from a second set of structured and unstructured data objects and (b) a data code stored in a structured data object from the first set or from the second set, and (2) defines a second logical relationship that is between the first concept and the third concept, the second logical relationship based on a second regular expression indicating (a) a presence of a text string in an unstructured data object from the first set or from the second set and (b) a data code stored in a structured data object from the first set or from the second set, the second logical relationship defining a business rule; and
- executing the business rule on a third set of structured and unstructured data objects to make a prediction whether the second set of structured and unstructured data objects satisfies the business rule.

15. The method of claim 14, further comprising:
- receiving a third plurality of user input signals responsive to the information, each user input signal from the third plurality including indication of a desired change to a definition of the one or more of the first concept, the second concept or the third concept; and
- updating the definition of the one or more of the first concept, the second concept and the third concept based on the third plurality of user input signals.

16. The method of claim 14, further comprising:
- analyzing the concept hierarchy to detect a presence of one or more relationships between the first concept, the second concept and the third concept; and
- updating the concept hierarchy to define the one or more relationships.

17. The method of claim 14, further comprising:
- applying the business rule to one or more sets of test data;
- generating one or more reports based on the applying;
- receiving a user input signal responsive to the one or more reports, the user input signal indicating a desired change to the business rule; and
- updating the business rule to effectuate the desired change.

18. The method of claim 14, wherein the first set of structured and unstructured data objects and the second set of structured and unstructured data objects are disjoint sets.

* * * * *